United States Patent
Novin

(10) Patent No.: US 9,644,412 B2
(45) Date of Patent: May 9, 2017

(54) VARIABLE FRICTION HINGE

(71) Applicant: Southco, Inc., Concordville, PA (US)

(72) Inventor: Eugene Novin, Concordville, PA (US)

(73) Assignee: SOUTHCO, INC., Concordville, PA (US)

( * ) Notice: Subject to any disclaimer, the term of this patent is extended or adjusted under 35 U.S.C. 154(b) by 0 days.

(21) Appl. No.: 14/527,063

(22) Filed: Oct. 29, 2014

(65) Prior Publication Data

US 2015/0121654 A1    May 7, 2015

Related U.S. Application Data

(60) Provisional application No. 61/899,555, filed on Nov. 4, 2013.

(51) Int. Cl.
| | |
|---|---|
| *E05D 11/08* | (2006.01) |
| *E05D 3/02* | (2006.01) |
| *G06F 1/16* | (2006.01) |
| *H04M 1/02* | (2006.01) |

(52) U.S. Cl.
CPC ............ *E05D 11/082* (2013.01); *E05D 3/02* (2013.01); *G06F 1/1681* (2013.01); *H04M 1/0216* (2013.01); *Y10T 16/537* (2015.01)

(58) Field of Classification Search
CPC .......... Y10T 16/54038; Y10T 16/5403; Y10T 16/5387; Y10T 16/540255; E05D 11/08; E05D 11/081; E05D 11/082; E05D 11/084; E05D 11/085; E05D 11/087; E05D 11/10; E05D 11/105; E05D 2011/1035; E05Y 2900/606; E05Y 2201/49; G06F 1/1681; G06F 1/1616; H04M 1/0261

See application file for complete search history.

(56) References Cited

U.S. PATENT DOCUMENTS

| | | | |
|---|---|---|---|
| 5,491,874 A | 2/1996 | Lowry et al. | |
| 5,598,607 A * | 2/1997 | Katagiri | E05D 11/084 16/337 |
| 5,632,066 A * | 5/1997 | Huong | G06F 1/1616 16/338 |

(Continued)

FOREIGN PATENT DOCUMENTS

| | | | | |
|---|---|---|---|---|
| DE | 2437494 A1 * | 2/1976 | ........... | E05D 11/082 |
| GB | 356854 A * | 9/1931 | ......... | E05D 11/1007 |

(Continued)

*Primary Examiner* — Chuck Mah
(74) *Attorney, Agent, or Firm* — RatnerPrestia

(57) ABSTRACT

This invention provides a hinge assembly having variable friction resistance. The hinge assembly includes an elongated element having a generally cylindrical surface extending longitudinally. It also includes at least one torque element having a generally cylindrical surface compressively engaged with the cylindrical surface of the elongated element, the cylindrical surface of the at least one torque element having end portions. An actuator of the hinge assembly is configured for changing friction resistance generated by the at least one torque element by changing the relative position of the end portions of the at least one torque element, thus reducing compressive engagement between the cylindrical surface of the at least one torque element and the cylindrical surface of the elongated element.

20 Claims, 19 Drawing Sheets

(56) References Cited

U.S. PATENT DOCUMENTS

| | | | | |
|---|---|---|---|---|
| 5,682,645 A * | 11/1997 | Watabe | G06F 1/1681 | 16/338 |
| 5,752,293 A | 5/1998 | Lowry et al. | | |
| 6,085,388 A * | 7/2000 | Kaneko | G06F 1/1616 | 16/274 |
| 6,301,748 B1 * | 10/2001 | Su-Man | G06F 1/1616 | 16/337 |
| 6,467,129 B1 * | 10/2002 | Bae | B60J 3/0265 | 16/308 |
| 6,530,123 B1 * | 3/2003 | Wahlstedt | G06F 1/1681 | 16/337 |
| 6,574,836 B1 * | 6/2003 | Steeber | E05C 17/045 | 16/337 |
| 8,701,251 B2 * | 4/2014 | Bohn | E05D 11/084 | 16/342 |
| 2002/0167789 A1 * | 11/2002 | Novin | B60R 11/0235 | 361/679.06 |
| 2003/0172497 A1 * | 9/2003 | Cha | E05D 11/082 | 16/342 |
| 2004/0134033 A1 * | 7/2004 | Raines | G02B 27/0149 | 16/342 |
| 2005/0102796 A1 * | 5/2005 | Lee | G06F 1/1601 | 16/342 |
| 2005/0125952 A1 * | 6/2005 | Lee | F16M 11/10 | 16/352 |
| 2006/0048337 A1 * | 3/2006 | Lowry | E05C 17/64 | 16/342 |
| 2007/0068760 A1 * | 3/2007 | Klopp | B60N 2/2255 | 192/15 |
| 2007/0109672 A1 * | 5/2007 | Lin | F16M 11/06 | 359/819 |
| 2008/0184527 A1 * | 8/2008 | Chao | G06F 1/1616 | 16/221 |
| 2009/0165248 A1 * | 7/2009 | Wang | E05D 11/082 | 16/339 |
| 2011/0047750 A1 * | 3/2011 | Novin | F16F 1/14 | 16/297 |
| 2011/0072620 A1 * | 3/2011 | Wang | G06F 1/1681 | 16/342 |
| 2011/0099761 A1 * | 5/2011 | Wang | G06F 1/1681 | 16/339 |
| 2012/0174339 A1 * | 7/2012 | Novin | E05D 3/02 | 16/334 |
| 2013/0078027 A1 * | 3/2013 | Hsu | G06F 1/1681 | 403/113 |
| 2014/0044473 A1 * | 2/2014 | Hsu | H04M 1/0216 | 403/120 |

FOREIGN PATENT DOCUMENTS

| | | | |
|---|---|---|---|
| JP | 2000008689 A | * | 1/2000 |
| JP | 2001241427 A | * | 9/2001 |
| KR | 20040003447 A | * | 1/2004 |
| WO | WO 9514842 | * | 6/1995 |

* cited by examiner

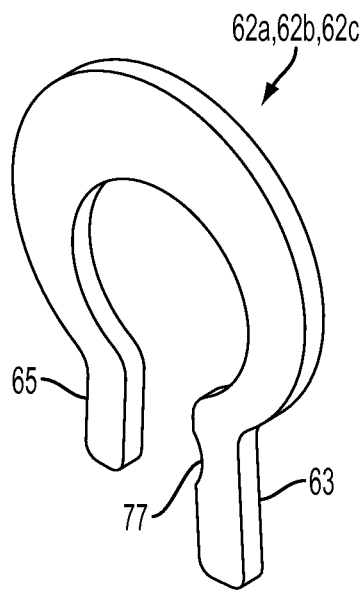
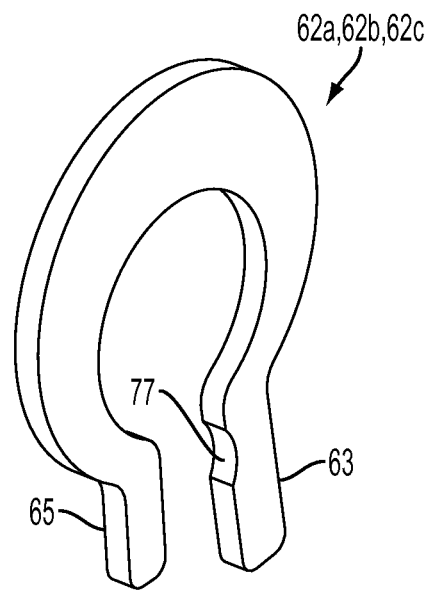
FIG. 9A  FIG. 9B
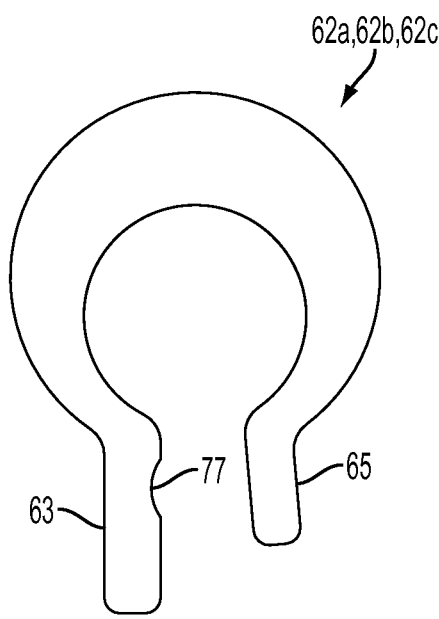
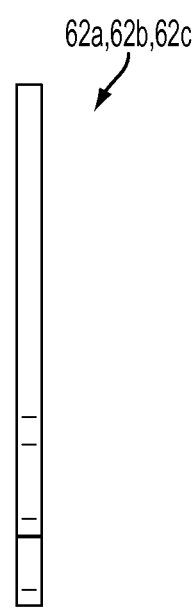
FIG. 9C  FIG. 9D

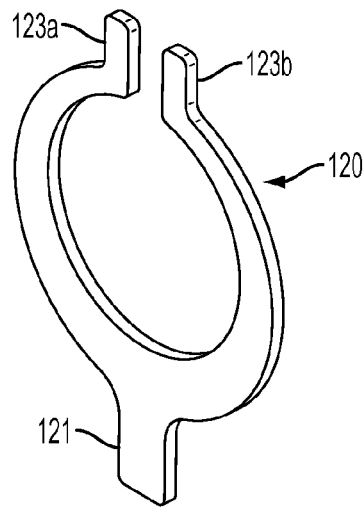
FIG. 17A
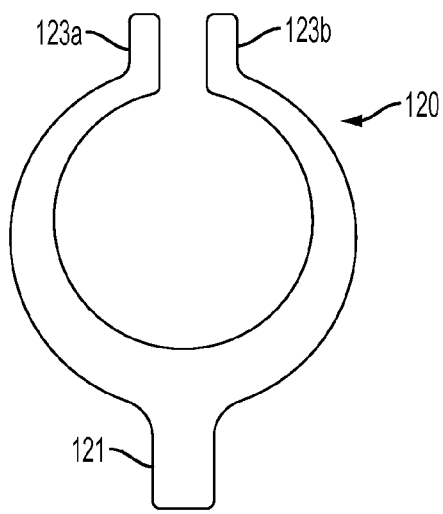 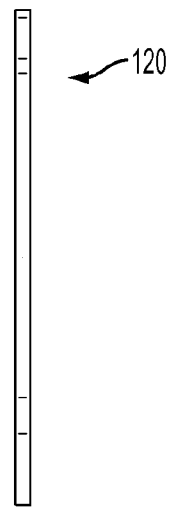
FIG. 17B          FIG. 17C
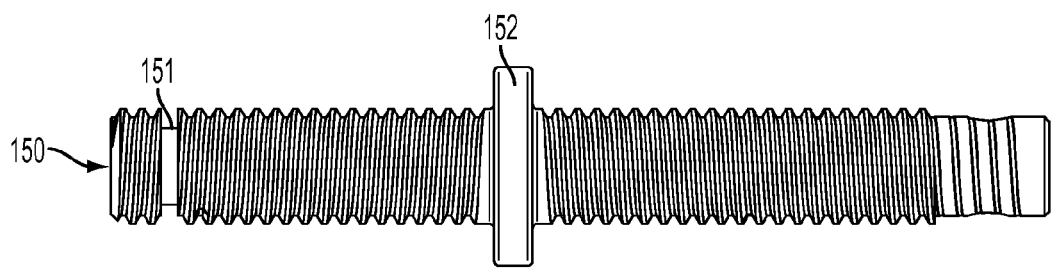
FIG. 18

VARIABLE FRICTION HINGE

CROSS REFERENCE TO RELATED APPLICATIONS

This application claims priority to U.S. Provisional Patent Application No. 61/899,555, filed Nov. 4, 2013, the contents of all of which are specifically incorporated herein by reference.

FIELD OF THE INVENTION

The present invention relates generally to a hinge assembly for rotatably coupling a first member to a second member and, more particularly, to a hinge assembly having viable friction.

BACKGROUND OF THE INVENTION

In the hinge field it is often desirable to control the angular position of a first member which is rotatably coupled to a second member. Common applications of such a hinge include laptops having a display screen. Such a hinge may also be used in any application in which a display screen or other member is desirably rotated or otherwise moved among positions.

In a vehicle, for example, a display screen can be rotated and held in an angular position by torque generated between friction elements in a hinge and a shaft of the hinge. As described in U.S. Pat. No. 5,491,874, for example, many types of friction elements can be used, and friction torque can be generated on an outside surface of a shaft as well as on an inside surface of a shaft. U.S. Pat. No. 5,491,874 is incorporated herein by reference for all purposes, including its disclosure of friction elements and friction torque generated on outside or inside surfaces of a shaft.

Despite the development of friction hinges such as those disclosed in U.S. Pat. No. 5,491,874, further improvements in friction hinges are desired to accomplish at least one of improved performance and reduced cost.

SUMMARY OF THE INVENTION

According to one aspect, this invention provides a hinge assembly having variable friction resistance. The hinge assembly includes an elongated element having a generally cylindrical surface extending longitudinally. It also includes at least one torque element having a generally cylindrical surface compressively engaged with the cylindrical surface of the elongated element, the cylindrical surface of the at least one torque element having end portions. An actuator of the hinge assembly is configured for changing friction resistance generated by the at least one torque element by changing the relative position of the end portions of the at least one torque element, thus reducing compressive engagement between the cylindrical surface of the at least one torque element and the cylindrical surface of the elongated element.

According to another aspect, this invention also provides a hinge assembly having variable friction torque including an elongated element having an elongated element surface extending generally along a longitudinal axis and at least one torque element positioned along the elongated element surface for rotation with respect to the longitudinal axis. The at least one torque element has end portions, a torque element surface extending between the end portions, a first condition in which at least a portion of the torque element surface is in friction contact with the elongated element surface, and a second condition in which the portion of the torque element surface in friction contact with the elongated element surface is reduced or eliminated. At least one actuator is coupled for movement with respect to the at least one torque element, the at least one actuator being configured to change the friction torque generated between the elongated element and the at least one torque element, the at least one actuator having an actuator surface positioned to contact at least one of the end portions of the at least one torque element and to change the distance between the end portions of the at least one torque element and thereby move the at least one torque element toward the first condition or the second condition, thus changing frictional resistance to rotation of the at least one torque element with respect to the elongated element.

The elongated element optionally includes a shaft extending along the longitudinal axis and the at least one torque element is positioned such that an inner torque element surface of the at least one torque element faces an outer elongated element surface of the shaft. Alternatively, the elongated element defines a cavity extending along the longitudinal axis and the at least one torque element is positioned such that an outer torque element surface of the at least one torque element faces an inner elongated element surface of the cavity.

The at least one actuator optionally includes a cam positioned for rotation with respect to the at least one torque element, the actuator surface being a cam surface contacting at least one of the end portions of the at least one torque element, wherein rotation of the cam with respect to the at least one torque element changes the distance between the end portions of the at least one torque element, thus changing frictional resistance to rotation of the at least one torque element with respect to the elongated element.

The hinge assembly optionally includes a plurality of torque elements, wherein the cam surface of the cam contacts at least one of the end portions of each of the torque elements, wherein rotation of the cam with respect to the torque elements changes the distance between the end portions of each of the torque elements, thus changing frictional resistance to rotation of each of the torque elements with respect to the elongated element. Alternatively, the cam surface of the cam contacts at least one of the end portions of fewer than all of the torque elements, wherein rotation of the cam with respect to the torque elements changes the distance between the end portions of fewer than all of the torque elements, thus changing frictional resistance to rotation of fewer than all of the torque elements with respect to the elongated element.

The cam can be configured for rotation by a user of the hinge assembly to adjust the frictional resistance to rotation of the at least one torque element with respect to the elongated element. The cam can be alternatively configured to rotate in response to the rotational position of the at least one torque element with respect to the elongated element to adjust the frictional resistance to rotation of the at least one torque element with respect to the elongated element based on the rotational position in a span of rotational movement. Also, the cam can be configured to rotate in response to the rotational direction of movement of the at least one torque element with respect to the elongated element to adjust the frictional resistance to rotation of the at least one torque element with respect to the elongated element based on the rotational direction of movement.

Optionally, the cam is positioned for rotation about an axis substantially parallel to the longitudinal axis of the elongated element. Alternatively, the cam is positioned for rotation about an axis substantially perpendicular to the longitudinal axis of the elongated element.

The at least one actuator optionally includes a wedge positioned for movement with respect to the at least one torque element, the actuator surface being a wedge surface contacting at least one of the end portions of the at least one torque element, wherein movement of the wedge with respect to the at least one torque element changes the distance between the end portions of the at least one torque element, thus changing frictional resistance to rotation of the at least one torque element with respect to the elongated element.

The hinge assembly optionally includes a plurality of torque elements, wherein the wedge surface of the wedge contacts at least one of the end portions of each of the torque elements, wherein movement of the wedge with respect to the torque elements changes the distance between the end portions of each of the torque elements, thus changing frictional resistance to rotation of each of the torque elements with respect to the elongated element. Alternatively, the wedge surface of the wedge contacts at least one of the end portions of fewer than all of the torque elements, wherein movement of the wedge with respect to the torque elements changes the distance between the end portions of fewer than all of the torque elements, thus changing frictional resistance to rotation of fewer than all of the torque elements with respect to the elongated element.

The wedge can be configured for movement by a user of the hinge assembly to adjust the frictional resistance to rotation of the at least one torque element with respect to the elongated element. Alternatively, the wedge is configured to move in response to the rotational position of the at least one torque element with respect to the elongated element to adjust the frictional resistance to rotation of the at least one torque element with respect to the elongated element based on the rotational position in a span of rotational movement. The wedge can also be configured to move in response to the rotational direction of movement of the at least one torque element with respect to the elongated element to adjust the frictional resistance to rotation of the at least one torque element with respect to the elongated element based on the rotational direction of movement.

The wedge is optionally configured for movement in a direction substantially parallel to the longitudinal axis of the elongated element. Alternatively, the wedge is configured for movement in a radial direction with respect to the longitudinal axis of the elongated element. The hinge assembly can also include plural wedges.

The at least one torque element optionally includes a clip. It can also include a band.

According to yet another aspect, this invention also provides a hinged system assembly having variable friction torque, the hinged system including components positioned for rotational movement with respect to one another and a hinge assembly coupled to the components. At least one actuator is configured to change the friction torque generated between the components, thus changing frictional resistance to rotation of the components with respect to one another.

According to yet another aspect, this invention provides a method for facilitating variable friction resistance in a hinge. The method includes compressively engaging a generally cylindrical surface of at least one torque element with a generally cylindrical surface of an elongated element. It also includes positioning an actuator to selectively change the relative position of end portions of the at least one torque element to change the friction resistance generated by the at least one torque element, thus reducing compressive engagement between the cylindrical surface of the at least one torque element and the cylindrical surface of the elongated element.

According to another aspect of the invention, a method is provided for varying friction resistance between components positioned for rotational movement with respect to one another. The method includes rotating the components with respect to one another away from a first position toward a second position causing at least one torque element to rotate with respect to an elongated element in a first condition in which at least a portion of a torque element surface of the at least one torque element is in friction contact with an elongated element surface of the elongated element. The method also includes changing the friction torque generated between the elongated element and the at least one torque element at the second position by changing the distance between end portions of the at least one torque element and moving the at least one torque element from the first condition toward a second condition in which the portion of the torque element surface in friction contact with the elongated element surface is reduced or eliminated, thus changing frictional resistance to rotation of the at least one torque element with respect to the elongated element. The components are then rotated with respect to one another away from the second position toward a third position with reduced friction resistance between components.

In another aspect of the invention, the hinge assembly having variable friction torque includes an elongated element having an elongated element surface extending generally along a longitudinal axis and at least one torque element positioned along the elongated element surface for rotation about the longitudinal axis. The at least one torque element has end portions, a torque element surface extending between the end portions, a first condition in which at least a portion of the torque element surface is in friction contact with the elongated element surface, and a second condition in which the portion of the torque element surface in friction contact with the elongated element surface is reduced or eliminated. Means are provided for changing the friction torque generated between the elongated element and the at least one torque element by changing the distance between the end portions of the at least one torque element and moving the at least one torque element toward the first condition or the second condition, thus changing frictional resistance to rotation of the at least one torque element with respect to the elongated element. The means for changing the friction torque can include a cam positioned for rotation with respect to the at least one torque element, the cam having a cam surface contacting at least one of the end portions of the at least one torque element, wherein rotation of the cam with respect to the at least one torque element changes the distance between the end portions of the at least one torque element, thus changing frictional resistance to rotation of the at least one torque element with respect to the elongated element. Alternatively, the means for changing the friction torque can include at least one wedge positioned for movement with respect to the at least one torque element, the wedge having a wedge surface contacting at least one of the end portions of the at least one torque element, wherein movement of the wedge with respect to the at least one torque element changes the distance between the end portions of the at least one torque element, thus changing frictional resistance to rotation of the at least one torque element with respect to the elongated element.

BRIEF DESCRIPTION OF THE DRAWING

FIGS. 3A and 3B show schematic perspective views illustrating a type of hinge assembly in which an actuator includes a wedge according to embodiments of the invention. FIG. 3A shows a schematic perspective view of an embodiment of the invention in which a wedge is movable in a direction transverse to an axis of a shaft. FIG. 3B shows a schematic perspective view of an embodiment of the invention in which a wedge is movable in a direction substantially parallel to an axis of a shaft.

FIGS. 3C and 3D show schematic perspective views illustrating a type of hinge assembly in which an actuator includes a cam according to embodiments of the invention. FIG. 3C shows a schematic perspective view of an embodiment of the invention in which a cam is rotatable about an axis transverse to an axis of a shaft. FIG. 3D shows a schematic perspective view of an embodiment of the invention in which a cam is rotatable about an axis oriented substantially parallel to an axis of a shaft.

FIGS. 4A through 9D illustrate an embodiment of the invention in which a cam is used to adjust friction torque.

FIG. 4A shows a perspective view of a hinge assembly according to an embodiment of the invention.

FIG. 6 shows an expanded perspective view of the hinge assembly of FIG. 4A.

FIGS. 7-9D show components of the hinge assembly of FIG. 4A.

FIG. 7 shows a perspective view of an arm component of the hinge assembly of FIG. 4A.

FIG. 9A shows a perspective view of a torque element component of the hinge assembly of FIG. 4A.

FIG. 9B shows another perspective view of the torque element of FIG. 9A.

FIG. 9C shows a plan view of the torque element of FIG. 9A.

FIG. 9D shows a side view of the torque element of FIG. 9A.

FIGS. 10A through 18 illustrate another embodiment of a hinge assembly according to the invention.

FIG. 10A shows a perspective view of a hinge assembly according to an embodiment of the invention.

FIG. 13 shows an expanded perspective view of the hinge assembly of FIG. 10A.

FIGS. 14 through 18 show components of the hinge assembly of FIG. 10A.

FIG. 14 shows a perspective view of a mid plate component of the hinge assembly of FIG. 10A.

FIG. 15 shows a perspective view of a right adjustment nut component of the hinge assembly of FIG. 10A.

FIG. 16 shows a perspective view of a left adjustment nut component of the hinge assembly of FIG. 10A.

FIG. 17A shows a perspective view of a torque element component of the hinge assembly of FIG. 10A.

FIG. 17B shows a plan view of the torque element component of FIG. 17A.

FIG. 17C shows a side view of the torque element component of FIG. 17A.

FIG. 18 shows a side view of a screw shaft component of the hinge assembly of FIG. 17A.

DETAILED DESCRIPTION OF THE INVENTION

Figure 1:
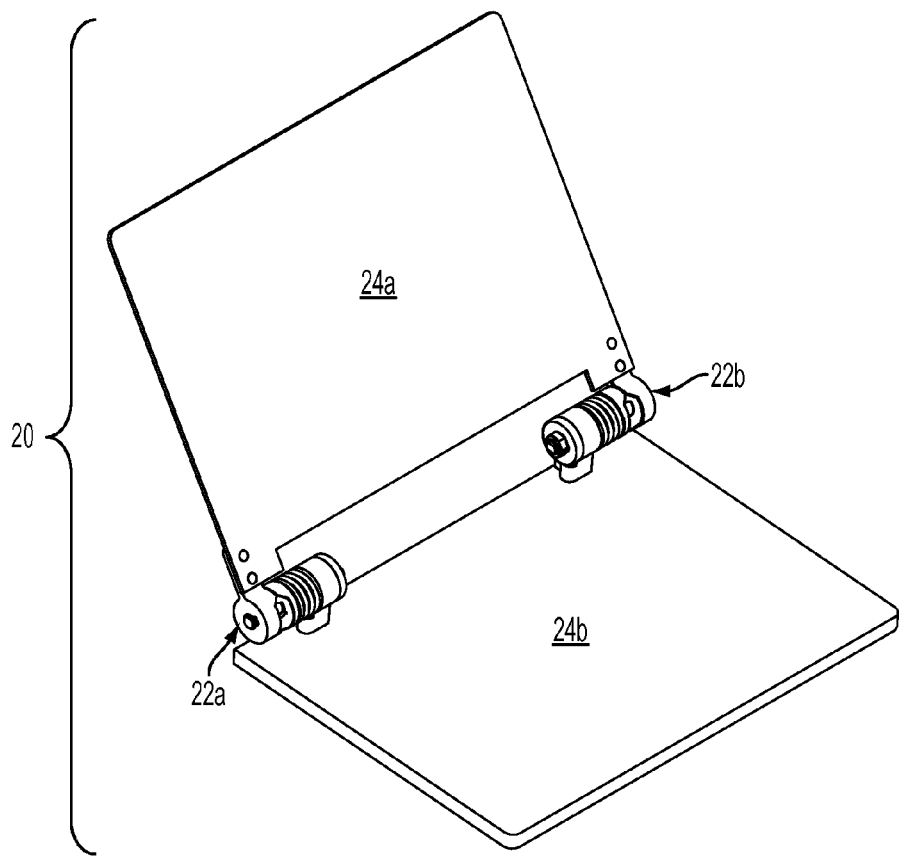
FIG. 1 shows a perspective view of a hinged system assembly including hinge assemblies providing variable friction torque according to an embodiment of the invention.

The invention will now be described by reference to exemplary embodiments and variations of those embodiments. Although the invention is illustrated and described herein with reference to specific embodiments, the invention is not intended to be limited to the details shown and described. Rather, various modifications may be made in the details within the scope and range of equivalents of the claims and without departing from the invention.

Generally, this invention provides a means for selectively reducing or eliminating frictional resistance to rotation of hinged components with respect to one another. For example, a friction torque mechanism can be used according to the invention to adjust or modify the friction torque generated between a torque generating element, such as a clip or band, and an elongated element, such as a shaft or pintle. The condition of the torque generating element can be changed such as by changing the distance between end portions of a clip, thereby changing its frictional resistance to rotation.

An actuator such as, for example, a wedge or a cam or equivalent surface or mechanism can be used to change the condition of the torque generating element, the actuator being movable with respect to the torque generating element. Torque control can be accomplished by user selection, by rotational position of the hinged components with respect to one another, and/or by the rotational direction of the motion of the hinged components with respect to one another. The torque control can include complete torque release, graduated torque reduction, or combinations of these torque controls.

In use, this invention makes it possible to vary the force required to adjust the relative position of hinged components. For example, a display screen mounted in a vehicle can be provided with an adjustment force that changes depending on its rotational position. This will permit the screen to stay steady in a viewing position under vehicle acceleration and deceleration. Also, the friction resistance of the screen to rotation can be reduced in a closing position or adjusted in a closing direction and an opening direction.

Variable friction torque hinging mechanisms according to aspects of this invention generate frictional resistance to rotation and can be used in positioning objects of interest relative to observation point or gravity direction. For example, such mechanisms can be used to position a computer screen or any type of monitor or display for comfortable viewing by a person, they can support a lid or cover of equipment required to be lifted up and lowered, or they can be used in a wide variety of other applications in which components are coupled by a hinge. This type of mechanism can be designed, for example, to be compatible with different weight objects or can compensate for variations of load moment due to a change of position relative to gravity direction.

In one aspect of this invention, the hinge assembly can operate by reducing (or eliminating) friction moment between an elongated element such as a cylindrical pintle and one or more deformable torque generating elements clamped on the elongated element. For example, friction force generated between a pintle and a torque element is produced by pressure on the surface of the pintle from compressive force of the torque element expanded over the pintle. Friction resistance to rotation can therefore be reduced according to aspects of this invention by spreading apart ends of clamped torque elements on the pintle surface. The spreading action can be produced by wedging apart a torque element's ends with linear motion along a pintle axis or across it transverse to or angled with respect to the pintle's axis. The spreading action can also or alternatively be produced by rotational motion of a cam mechanism acting upon a torque element's ends. And in case of using an internal surface of a shaft or pintle for generating friction resistance, opposite to spreading action can be performed.

In this embodiment, a variable friction hinging mechanism is provided in which friction torque is controlled internally to the hinge according to relative angular positions of the hinge input and output components. In other words, the hinge can perform self-torque-adjustment programmed into the mechanism by a cam profile controlling a spreading action of two ends of torque elements. A torque generating portion of the hinge can include multiple identical torque elements stacked together on a pintle or cylindrical shaft and having asymmetrical shape with one end being trapped in a housing by plastic deformation. Such an arrangement will produce asymmetrical friction torque generated by the hinge due to "wrap effect". Second ends of the torque elements are controlled by cam action against first ends of torque elements simultaneously by a single cam. Alternatively, simultaneous torque change can be transformed into sequential, distributed torque change over a certain angle of rotation by splitting a single cam into multiple cams and offsetting them by their angular position. A cam acting upon ends of torque elements in this implementation (a "spreading cam" for example) can include a body riding in a mating cylindrical cavity of a first torque element end and roller sliding in a cylindrical cavity of the body and rolling on the surface of a second end of the torque element. This arrangement allows the hinge to minimize wear on contacting surfaces. Alternatively, the cam acting upon ends of torque elements could be shaped to have a one piece eccentric structure to provide the same function. Other components of the hinging mechanism are provided for constraining the torque elements, cams and shaft. A pair of face cams outside of the friction mechanism are provided to create driving moment to an output component in predetermined relative angular positions.

Referring generally to the figures, one aspect of this invention provides a hinge assembly 40, 100 having variable friction torque including an elongated element such as a shaft 56, 110 having an elongated element surface extending generally along a longitudinal axis and at least one torque element such as torque element 62, 120 positioned along the elongated element surface for rotation with respect to the longitudinal axis. The at least one torque element has end portions such as ends 63, 65, 123, a torque element surface extending between the end portions, a first condition such as that shown in FIGS. 5C and 12A in which at least a portion of the torque element surface is in friction contact with the elongated element surface (or when the torque element surface is in full contact with the elongated element surface), and a second condition such as that shown in FIGS. 4F and 12C in which the friction or compressive force generated between the elongated element and the torque element is reduced or eliminated. Although not necessary, this reduction or elimination of the friction or compressive force can be accomplished, for example, when the portion of the torque element surface in friction contact with the elongated element surface is reduced or eliminated. At least one actuator such as roller pin 68 and nut 190 is coupled for movement with respect to the at least one torque element, the at least one actuator being configured to change the friction torque generated between the elongated element and the at least one torque element, the at least one actuator having an actuator surface positioned to contact at least one of the end portions of the at least one torque element and to change the distance between the end portions of the at least one torque element and thereby move the at least one torque element toward the first condition or the second condition, thus changing frictional resistance to rotation of the at least one torque element with respect to the elongated element.

According to yet another aspect, this invention also provides a hinged system assembly such as hinged system 20 having variable friction torque, the hinged system including components (such as panels 24 of hinged system 20 and components 104a, 104b of hinged system 100 for example) positioned for rotational movement with respect to one another and a hinge assembly (such as hinge assembly 22a, 22b, 40 (corresponding to hinge assembly 22a), and 100 for example) coupled to the components. At least one actuator such as roller pin 68 and nut 190 is configured to change the friction torque generated between the components, thus changing frictional resistance to rotation of the components with respect to one another.

According to yet another aspect, this invention provides a method for facilitating variable friction resistance in a hinge including compressively engaging a generally cylindrical surface of at least one torque element such as torque element 62, 120 with a generally cylindrical surface of an elongated element such as a shaft 56, 110. It also includes positioning an actuator such as roller pin 68 and nut 190 to selectively change the relative position of end portions such as ends 63, 65, 123 of the at least one torque element to change the friction resistance generated by the at least one torque element, thus reducing compressive engagement between the cylindrical surface of the at least one torque element and the cylindrical surface of the elongated element.

A method is provided for varying friction resistance between components such as panels 24 of hinged system 20 and components 104a, 104b of hinged system 100 positioned for rotational movement with respect to one another. The method includes rotating the components with respect to one another away from a first position toward a second position causing at least one torque element such as torque element 62, 120 to rotate with respect to the longitudinal axis of an elongated element such as a shaft 56, 110 in a first condition in which at least a portion of a torque element surface of the at least one torque element is in friction contact with an elongated element surface of the elongated element (or when the torque element surface is in full contact with the elongated element surface). The method also includes changing the friction torque generated between the elongated element and the at least one torque element at the second position by changing the distance between end portions such as ends 63, 65, 123 of the at least one torque element and moving the at least one torque element from the first condition toward a second condition in which the friction or compressive force generated between the elongated element and the torque element is reduced or eliminated. Although not necessary, this reduction or elimination of the friction or compressive force can be accomplished, for example, when the portion of the torque element surface in friction contact with the elongated element surface is reduced or eliminated, thus changing frictional resistance to rotation of the at least one torque element with respect to the elongated element. The components are then rotated with respect to one another away from the second position toward a third position with reduced friction resistance between components.

Figure 2:
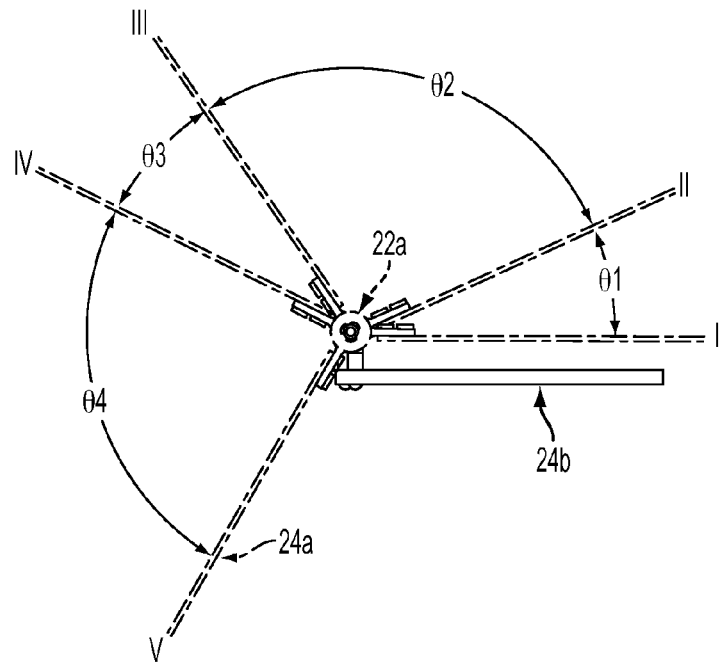
FIG. 2 shows a side view of the hinged system assembly shown in FIG. 1, illustrated in various positions shown in broken lines.

Referring now to the embodiment illustrated in FIGS. 1 and 2, a hinged system assembly 20 having variable friction torque according to one embodiment of the invention includes components, such as a first panel 24a and second panel 24b, which are coupled for rotational movement with respect to one another by means of a pair of hinge assemblies 22a and 22b. The first panel 24a and second panel 24b are positioned for rotational movement with respect to one another about an axis defined by the hinge assemblies 22a and 22b. One or both of the hinge assemblies 22a and 22b includes at least one actuator configured to change the friction torque generated between the components, thus changing frictional resistance to rotation of the components with respect to one another.

Various positions for the first panel 24a are illustrated in FIG. 2, in which the second panel 24b is stationary while first panel 24a is rotated with respect to second panel 24b. In an initial closed position T, the first panel 24a is generally parallel to second panel 24b. The first panel 24a may be rotated to a first intermediate position II in which the first panel 24a has traveled a first span θ1 from position I to position II. Rotation may continue through a second, third, and fourth span (θ2, θ3, and θ4, respectively) through positions III and IV until reaching a final open position V. The torque needed to rotate the first panel 24a through each of the respective spans θ1, θ2, θ3, and θ4 may differ according to the configuration of the hinge assemblies 22a, 22b.

More specifically, position I shown in FIG. 2 can have an angular position of 0 degrees. The hinge assemblies 22a, 22b can be considered to be fully closed. In position I, mating cam faces of adapter 41 and cam 46 components of the hinge assemblies 22a, 22b (see for example FIG. 4A and accompanying description) are fully seated together such that the cam is translated as far as it can go toward the adapter. Thus, the hinge is fully biased into the closed position I. Friction torque generated by torque elements 62 in this position, for example, can be minimal or no friction to increase efficiency of cam action.

In position II, the hinge assemblies 22a, 22b may place the panels 24A and 248 just past the cusp of being biased closed. Position II can therefore be a first intermediate position in which the first panel 24a has traveled first span θ1 in which the hinge is no longer being biased toward the closed position I. In position II, the mating cam faces of the adapter 41 and cam 46 (see for example FIG. 6) are fully separated, just past the top-most point of their respective cam rises, and the cam is translated as far as it can go toward the housing. From this point on (further open), the cam and adapter stay in these same axially oriented positions with respect to each other but they remain compressed against each other by the force of the spring 48. Friction torque generated by the whole hinge system at this position is relatively low, if no changes occur to the condition of torque elements 62.

In position III, the hinge assembly can be considered to be at the end of a lower torque range. Throughout the range of hinge swing in span θ2 up to and including position III, for example, torque elements of the hinge assemblies 22a, 22b may impart the most minimum possible friction or even no friction to shafts of the hinge assemblies 22a, 22b.

In position IV, the hinge assembly can be considered to be at the start of a higher torque range. At this point, and from now on, the torque elements impart the most maximum possible friction to the shaft of the hinge assemblies 22a, 22b. Throughout the range of hinge swing in span θ3 up to and including position IV, for example, torque elements of the hinge assemblies 22a, 22b may impart increased friction to the shafts of the hinge assemblies 22a, 22b.

In position V, the hinge assembly can be considered to be fully open. In this position V, and throughout the swing range in span θ4 up to position V from position IV, the torque elements of the hinge assemblies 22a, 22b may still impart the most maximum possible friction to the shafts of the hinge assemblies 22a, 22b.

As will be explained in further detail, a hinge assembly according to this invention can be provided with any number of positions, any size of span angles, and a variety of friction torques. For example, in a vehicle, the fully dosed position of the hinge (such as position I) can be oriented to be against a back of a seat and a fully open position (such as position V) can be provided at a selected angle above horizontal. Nevertheless, various positions and span angles can be selected depending on the orientation and use of the hinge assembly.

As previously described, a hinge assembly according to various embodiments of the invention includes an elongated element, at least one torque element, and a means for changing the friction torque between the elongated element and the at least one torque element. FIGS. 3A through 3D show schematic perspective views illustrating various types of hinge assemblies according to aspects of the invention.

Figure 3A:
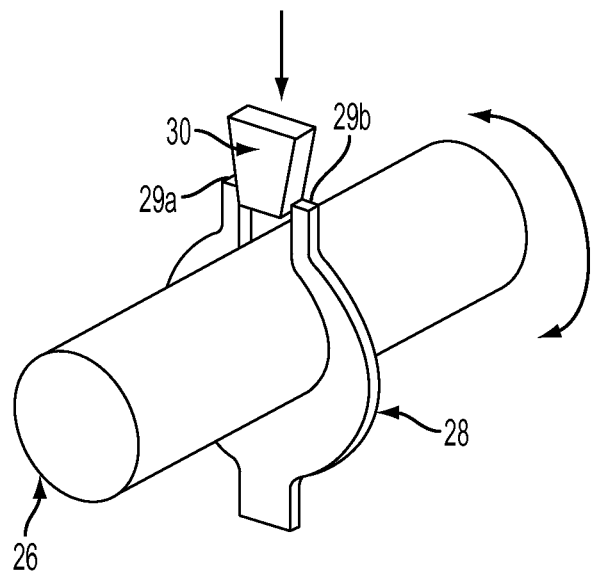
FIGS. 3A through 3D show schematic perspective views illustrating various types of hinge assemblies according to aspects of the invention.
Figure 3B:
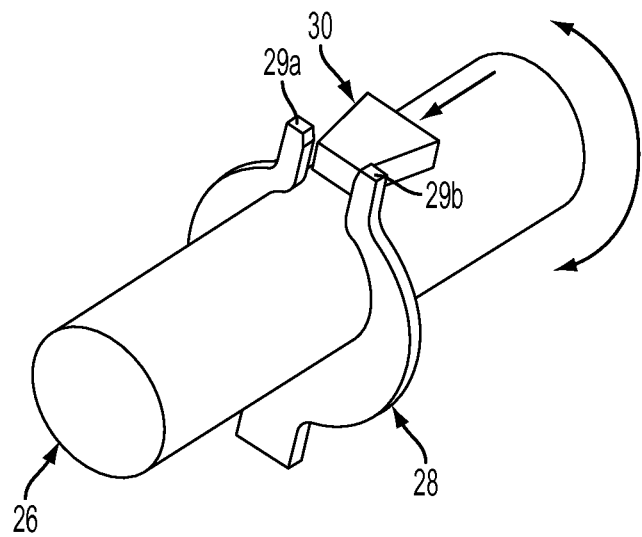

FIGS. 3A and 3B show schematic perspective views illustrating a type of hinge assembly in which the means for changing the friction torque between the elongated element and the at least one torque element includes an actuator in the form of a wedge. FIG. 3A shows a schematic perspective view of an embodiment of the invention in which a wedge is movable in a direction transverse to an axis of a shaft. FIG. 3B shows a schematic perspective view of an embodiment of the invention in which a wedge is movable in a direction substantially parallel to an axis of a shaft.

In an embodiment of the invention illustrated in FIG. 3A, for example, the means for changing friction torque is a wedge 30. A torque element 28 is in frictional engagement with the surface of an elongated element, such as pintle 26, thus resisting axial rotation of the pintle 26 with respect to the torque element 28, The torque element 28 includes two ends 29a, 29b between which the wedge 30 may be inserted to drive the two ends 29a, 29b apart, thereby reducing or eliminating frictional engagement between the torque element 28 and the pintle 26. In FIG. 3A the wedge 30 moves radially with respect to the pintle 26. For example, the direction along which wedge 30 moves can be substantially perpendicular to the axis of the pintle 26 but may also be oriented at different angles to drive the two ends 29a, 29b apart.

An embodiment of the invention illustrated in FIG. 3B is similar to that illustrated in FIG. 3A in that the means for changing friction torque is a wedge 30. In FIG. 3B, however, the wedge 30 moves in a direction that is substantially parallel to an axis of the pintle 26 but may also be oriented at different angles to drive the two ends 29a, 29b apart.

Figure 3C:
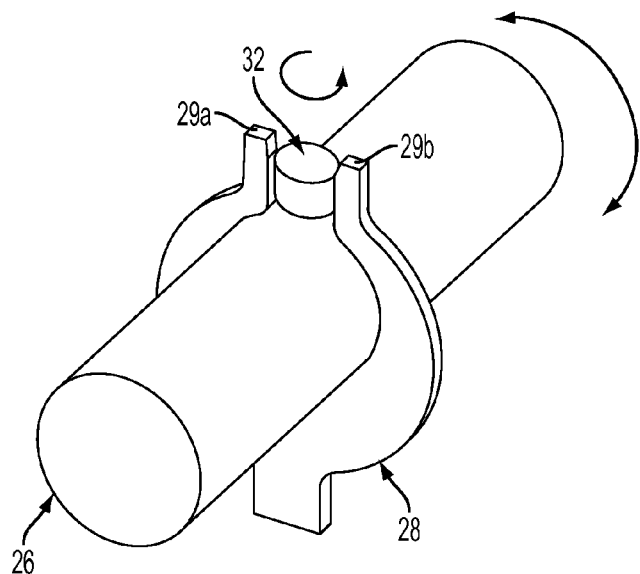
Figure 3D:
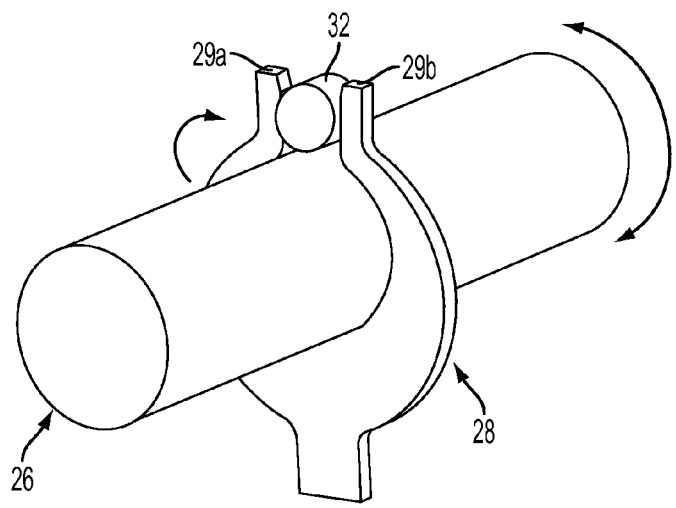

FIGS. 3C and 3D show schematic perspective views illustrating a type of hinge assembly in which the means for changing the friction torque between the elongated element and the at least one torque element includes an actuator in the form of a cam. FIG. 3C shows a schematic perspective view of an embodiment of the invention in which a cam is rotatable about an axis transverse to an axis of a shaft. In the embodiment of the invention illustrated in FIGS. 3C and 3D, the wedge of the embodiment illustrated in FIGS. 3A and 3B has been replaced with a cam 32 having an elliptical cross-section, the elliptical cross-section having a minor diameter and a major diameter. The cam 32 is positioned between the ends 29a, 29b of the torque element 28. When the torque element 28 is in frictional engagement with the pintle 26, the distance between the ends 29a, 29b of the torque element 28 is at least equal to the minor diameter of the cam 32. Upon rotation of cam 32 about its axis, the ends 29a, 29b are driven apart reducing or eliminating frictional engagement between the torque element 28 and the pintle 26 as the distance between the ends 29a, 29b of the torque element 28 increases. The axis of the cam 32 can be substantially perpendicular to the axis of the pintle 26 but may also be oriented at different angles to drive the two ends 29a, 29b apart.

FIG. 3D shows a schematic perspective view of an embodiment of the invention in which a cam is rotatable about an axis oriented substantially parallel to an axis of a shaft. More specifically, the embodiment illustrated in FIG. 3D is similar to that illustrated in FIG. 3C in that the means for changing friction torque is a cam 32. In FIG. 3D, however, the cam 32 rotates about an axis that is oriented to be substantially parallel to an axis of the pintle 26 but may also be oriented at different angles to drive the two ends 29a, 29b apart.

Various forms of torque elements are optionally used in a hinge assembly according to this invention, and the invention is not limited to any specific form of torque element. For example, the torque element may have a thin profile, such as those produced from stamping operations. Such a torque element is illustrated in FIGS. 3A through 3D. Torque elements may also be formed into bands, such as the torque element 31 illustrated in FIG. 3E. Increasing the force between the surface of the pintle and the surface of the torque element will increase the frictional engagement between the two elements, thereby requiring more torque to effect relative rotation. Increasing the force may therefore be achieved, for example, by using a plurality of torque elements or increasing the axial dimension of a single torque element. The degree of frictional engagement and the resulting friction torque can also be modified by adjusting the relative dimensions of the torque element and the shaft to increase or decrease the compression between surfaces of the torque element and the shaft. Additionally, the shape of the torque element can be modified to change the amount of force it can exert on the shaft, thus increasing or decreasing the frictional engagement between the torque element and the shaft.

Figure 3E:
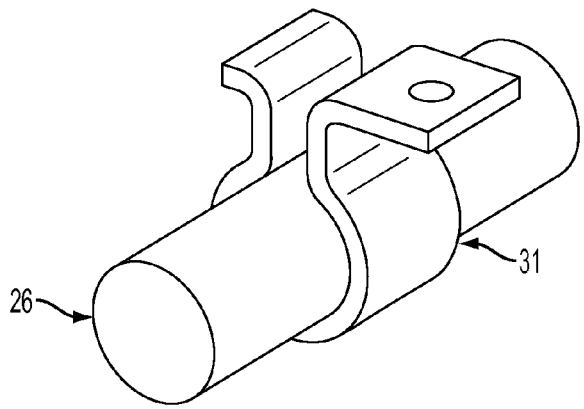
FIG. 3E shows a schematic perspective view illustrating an embodiment of a torque element formed in the shape of a band.

Referring to FIG. 3E, an additional embodiment of the torque element 31 can be used to allow more gradual adjustment of torque between conditions of the torque element 31. More specifically, the upwardly-extending legs at the end portions of the torque element 31 can optionally be provided with a selected degree of flexibility. By doing so, the spreading of those end portions away from one another can initially provide some gradual expansion of the torque element 31, thereby causing a slight or partial reduction in the compressive force applied by the torque element 31 against the pintle 26. The length, material, thickness, and/or shape of the upwardly-extending legs or end portions of the torque element 31 can be varied in order to control the degree to which compressive force is gradually or partially reduced as the ends of the torque element 31 are move moved with respect to one another.

In other words, the embodiment of the torque element 31 shown in FIG. 3E can be configured so as to provide a variable torque mechanism that allows more gradual adjustment because of the flexibility that is possible by use of longer legs or end portions. Referring to FIG. 2, for example, the concept of this variable torque mechanism can be used to provide a transition between conditions such as the condition of the torque element 31 as the hinge assembly moves from position I to position III and the condition of the torque element 31 as the hinge assembly moves from position III to position IV.

Figure 4A:
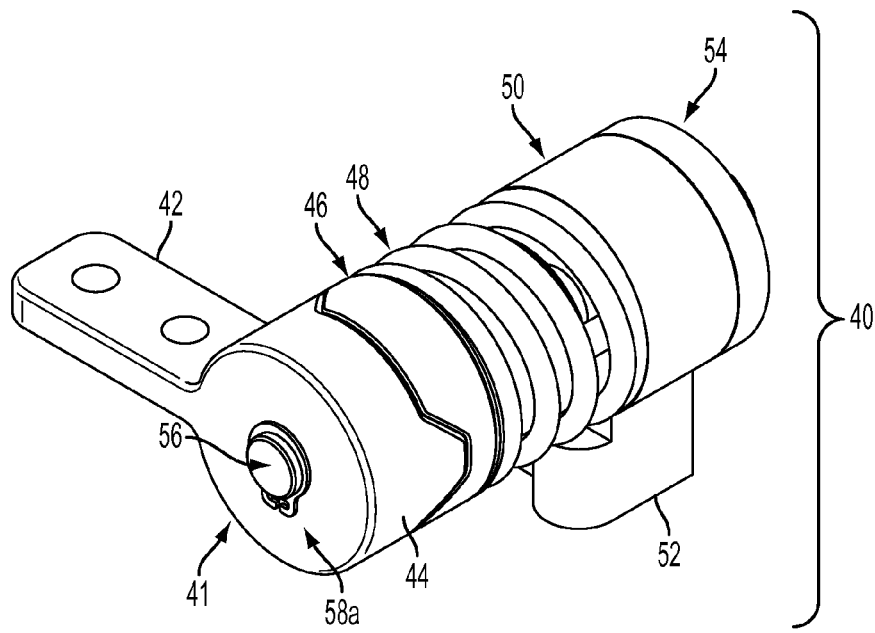

FIGS. 4A through 9D illustrate an embodiment of the invention in which a cam is used to adjust friction torque. FIG. 4A shows a perspective view of a hinge assembly; FIG. 4B shows a partial cross-sectional side view of the hinge assembly shown in FIG. 4A, defining sections 4E-4E and 4F-4F; and FIG. 4C shows another perspective view of the hinge assembly shown in FIG. 4A.

Figure 4B:
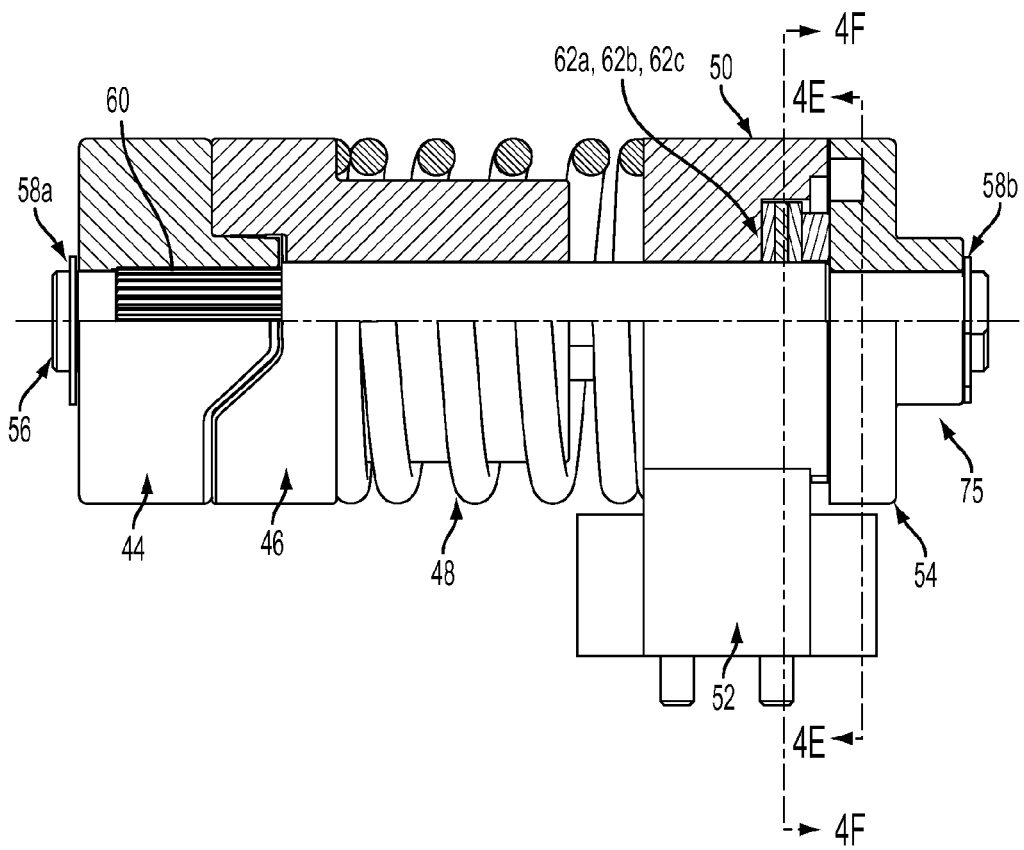
FIG. 4B shows a partial cross-sectional side view of the hinge assembly shown in FIG. 4A, defining sections 4E-4E and 4F-4F.
Figure 4C:
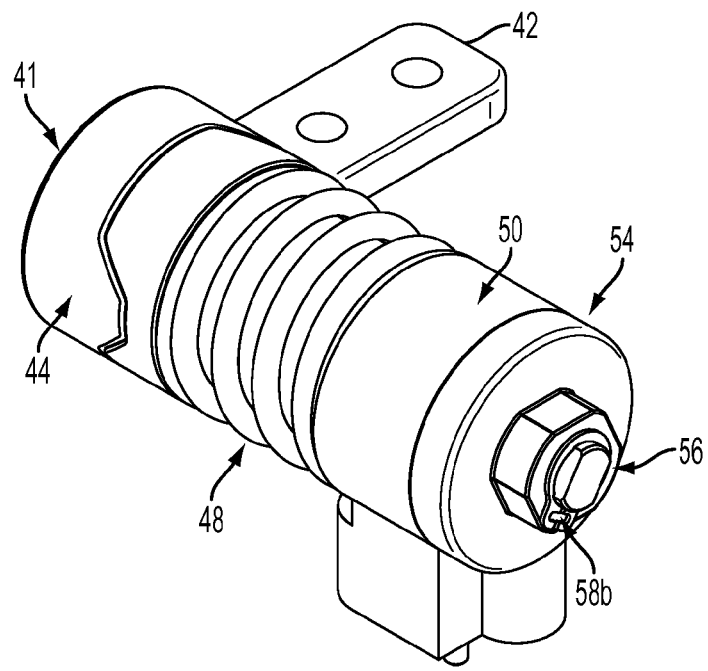
FIG. 4C shows another perspective view of the hinge assembly shown in FIG. 4A.

Referring specifically to FIGS. 4A, 4B, and 4C, the hinge assembly 40 comprises an adapter 41 having a leaf portion 42 and a cam actuating portion 44. The leaf portion 42 may be attached to a component, such as a panel as described above, by means of mounting apertures. The center of the cam actuating portion 44 of the adapter 41 includes a bore through which a shaft 56 is inserted and retained on the adapter 41 by a first spring clip 58a that limits axial movement of the shaft 56 with respect to the adapter 41 and may also include a knurl or splines 60 to prevent relative rotation between the shaft 56 and the adapter 41.

Along the shaft 56 and adjacent to the cam actuating portion 44 of the adapter 41 is a cam 46. The opposing surfaces of the cam actuating portion 44 and the cam 46 include protrusions and recesses which mate. As described previously and further below, mating cam faces of adapter 41 and cam 46 components of the hinge assembly 40 can be fully seated together such that the cam is translated as far as it can go toward the adapter. Thus, the hinge is fully biased into a closed position such as position I in FIG. 2. In another position such as position II in FIG. 2, the mating cam faces of the adapter 42 and cam 46 can be fully separated, just past the top-most point of their respective cam rises, and the cam 46 is translated as far as it can go toward the housing 50 of the hinge assembly 40. From this point on (further open), the cam 46 and adapter 41 can stay compressed by the force of spring 48 in these same axially oriented positions with respect to each other. In this way, the hinge assembly 40 can be used to bias a hinged system (such as that illustrated in FIGS. 1 and 2) toward selected positions depending on the rotational orientation of the components connected by the hinge assembly or assemblies.

The opposite end of the shaft 56 includes two generally parallel surfaces and is inserted into a similarly shaped bore within an end cap 54. The end cap 54 may include an extension 75 in order to provide a reinforced bearing surface for the shaft 56. An additional spring clip 58b is attached to this end of the shaft 56 to limit axial movement of the shaft 56 with respect to the end cap 54.

Adjacent to the end cap 54 is a housing 50 having a second leaf portion 52 that is configured for attachment to a panel or other component. The housing 50 includes a bore through which the shaft 56 extends. Located in between the cam 46 and the housing 50 is a compression spring 48. The ends of the spring bear against the opposing surfaces of the cam 46 and the housing 50 in order to bias the cam 46 away from the housing 50 and towards the adapter 41, thus keeping the cam surfaces of the cam 46 and adapter 41 in contact with one another.

When operated, the adapter 41, shaft 56, and end cap 54 rotate in unison while the cam 46 and housing 50 do not rotate. To prevent rotation of the cam 46 with respect to the housing 50, two pins 49a and 49b (FIG. 6) are inserted into apertures formed in the cam 46, one on either side of the shaft 56, and into apertures formed in the housing 50. As the adapter 41 rotates, the inclined surfaces on the cam actuating portion 44 of the adapter 41 slide along the inclined surfaces of the cam 46, thus compressing the spring 48 and urging the cam 46 to slide axially along the shaft 56 towards the housing 50. Accordingly, the cam 46, spring 48 and adapter 41 together bias the hinge assembly toward the position shown in FIG. 4A, which can be selected to correspond to one or more positions FIG. 2 such as position I and position V for example.

Figure 6:
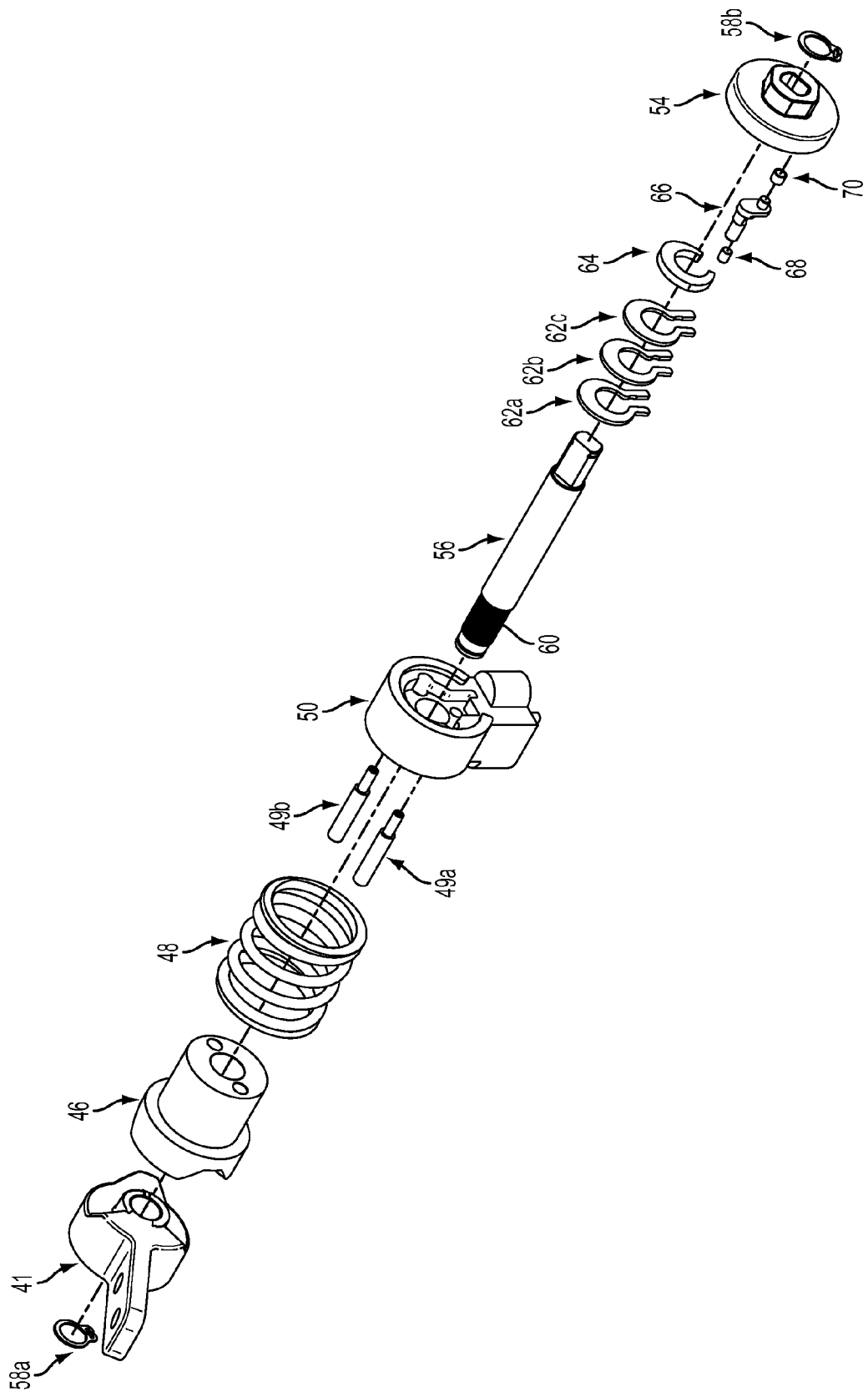

Upon rotation of the adapter 41, shaft 56, and end cap 54 into a position in which respective inclined surfaces of the cam actuating portion 44 and cam 46 transition to flat surfaces, the rotational bias caused by the cam surfaces will be relieved. Upon further rotation, the cam 46 will remain in the same axial position while the flat surfaces of the cam 46 and cam actuating portion 44 are in contact. Referring to FIG. 1, for example, flat surfaces of the cam 46 and cam actuating portion 44 are in contact with one another, causing increased compression of the spring 48. Also, this relative orientation of the cam 46 and cam actuating portion 44 is shown in FIG. 6, albeit in an expanded view. Protrusions and mating recesses on the cam 46 and cam actuating portion 44 can be configured to match only in one position within 360° of rotation (for example, they can be configured to match only in closed position I shown in FIG. 2) or they can optionally be configured to match multiple positions within 360° of rotation or a smaller range of rotation.

Contact between the inclined cam surfaces and the bias of spring 48 urge the hinged system toward a position such as a predetermined closed position for example. The location of the protrusions and recesses, as well as the degree of incline, may be modified to select the location(s) and degree of desired bias during rotation.

Referring to FIGS. 4D to 5C, the housing 50 of the hinge assembly 40 includes features which vary the torque resistance during rotation of the adapter 41. A plurality of torque elements 62a, 62b, and 62c (shown most clearly in FIG. 6) having a generally crescent shape are in frictional contact with the shaft 56 and are located in a cavity defined by surfaces of the housing 50 and the end cap 54. More specifically, the torque elements 62a, 62b, and 62c are positioned within a recess defined in housing 50. Although three torque elements 62a, 62b, and 62c are included in the illustrated embodiment, any number of torque elements can be used ranging from a single torque element to a larger number of torque elements, depending on the type and size of torque elements used and the amount of torque resistance desired.

Depending on the number and/or width of the torque elements located on the shaft 56, a spacer 64 may be interposed between the torque elements and the and cap 54. Compression force from the spring 48 will be applied to the spacer 64. Sliding surface between spacer 64 and end cap 54 will generate friction torque proportional to the force of spring 48.

Figure 4D:
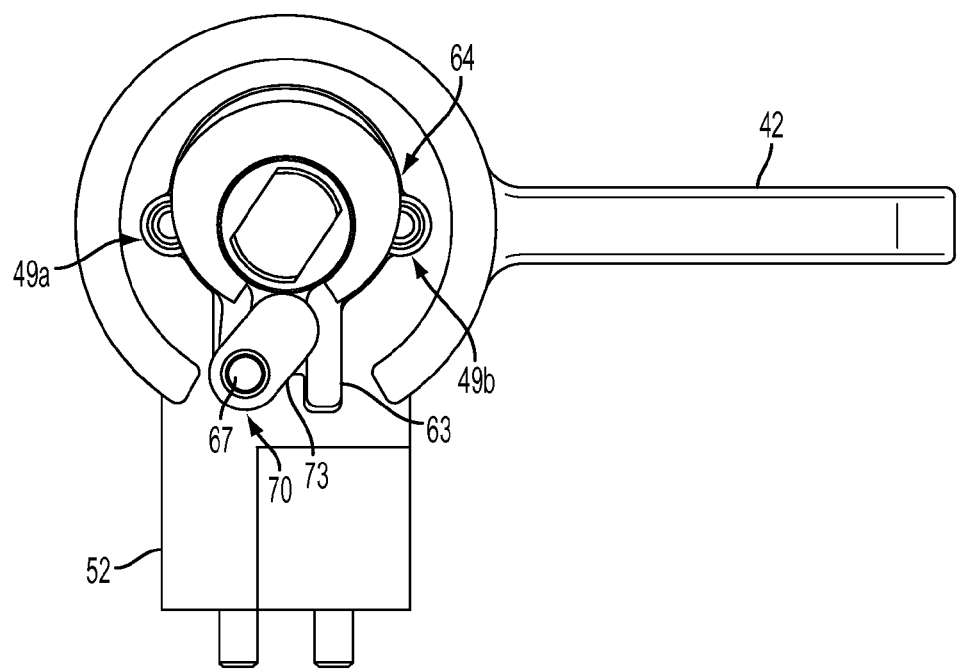
FIG. 4D shows the hinge assembly of FIG. 4C with an end cap component removed in order to reveal internal components of the hinge assembly.
Figure 4E:
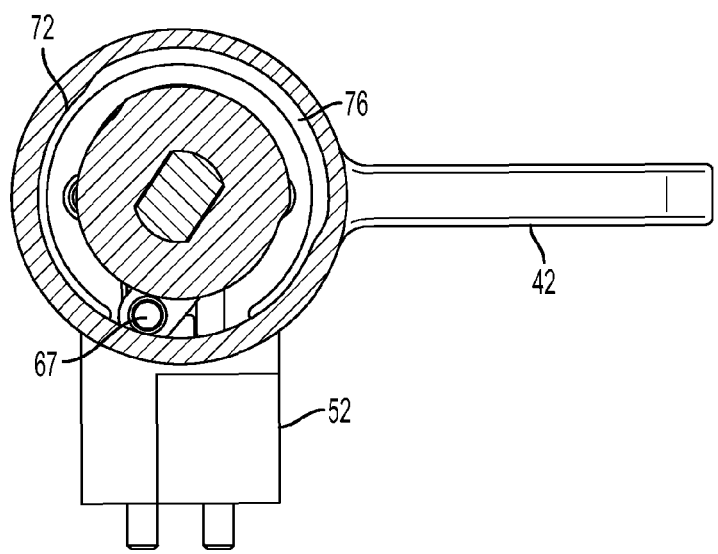
FIG. 4E shows a cross-sectional view of the hinge assembly at section 4E-4E shown in FIG. 4B.
Figure 4F:
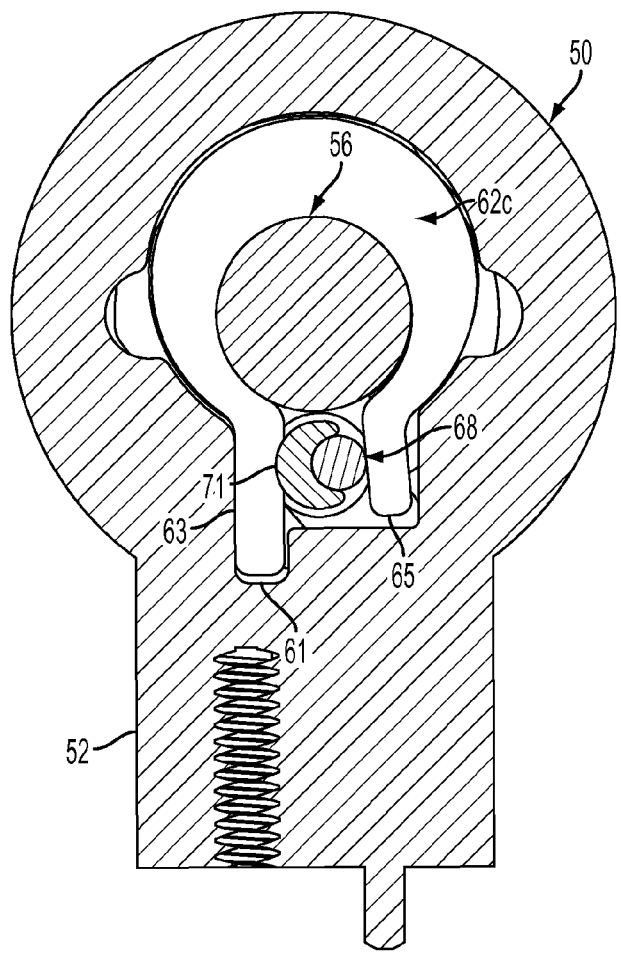
FIG. 4F shows a cross-sectional view of the hinge assembly at section 4F-4F shown in FIG. 4B.

Referring to FIG. 4F, which is a cross-sectional view along section 4F-4F defined in FIG. 4B, the inner surface of the torque element 62c is in frictional contact with an outer surface of the shaft 56. The torque element 62c includes two ends, a long end 63 and a short end 65. The long end 63 is inserted into a notch 61 formed on an inner portion of the second leaf portion 52 of the housing 50, thus preventing the long end 63 of the torque element 62c from rotating with the shaft 56. During the assembly process, a small gap may exist between the long end 63 of the torque element 62C and the wall of the notch 61. Such a small gap may be provided to facilitate assembly of the components. After assembly, force can be applied to the second leaf portion 52 of the housing 50 in order to deform it and to eliminate any gap between the long end 63 of the torque element 62C and the wall of the notch 61. In this way, the long end 63 of the torque element 62C can be secure fixed within the notch 61 to prevent its rotation or other movement.

Figure 7:
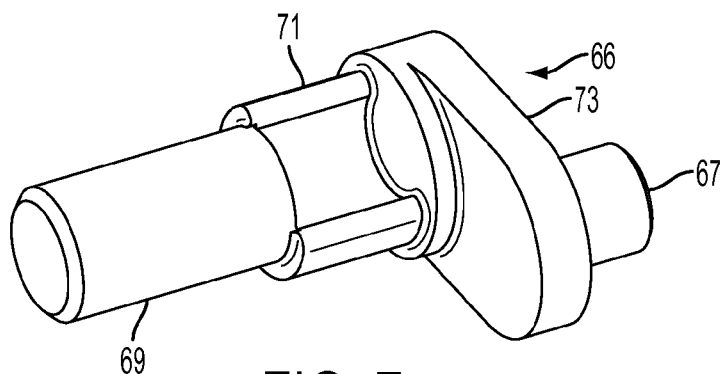

Located between the long end 63 and the short end 65 of the torque element 62c is a cradle 71 of a pivot cam 66 (see FIGS. 6 and 7) and a roller pin 68 which rests within the cradle 71 of the pivot cam 66. The torque element 62c may include a recess or cutout 77 to accommodate the cradle 71 (as illustrated in FIGS. 9A-9C). The pivot cam 66, as illustrated in FIG. 7, includes an axle 69, an arm 73 extending perpendicularly from the axle 69, and a knob 67 attached to the arm 73 and extending generally parallel to the axle 69. An optional sleeve 70 (FIG. 6) may be used to cover the knob 67 of the pivot cam 66 to reduce wear and allow free movement within a recess in the end cap described later. In other words, for the purpose of minimizing wear on the surface of the cam groove of the end cap 54, the pivot cam 66 is equipped with a tubular roller 70 to have rolling friction instead of sliding. While the pivot cam 66 is shown in multiple pieces, however, it is understood by those of skill in the art that the pivot cam may instead be provided in a unitary structure. For example, the roller pin 68 and sleeve 70 may be provided in a unitary structure or omitted.

Figure 8A:
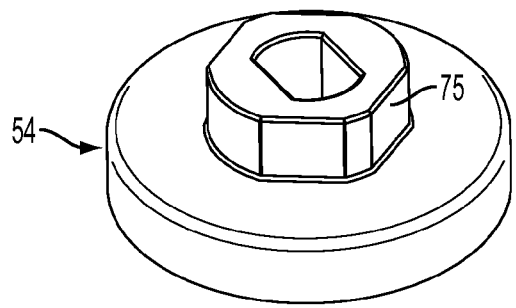
FIG. 8A shows a perspective view of an end cap component of the hinge assembly of FIG. 4A.
Figure 8B:
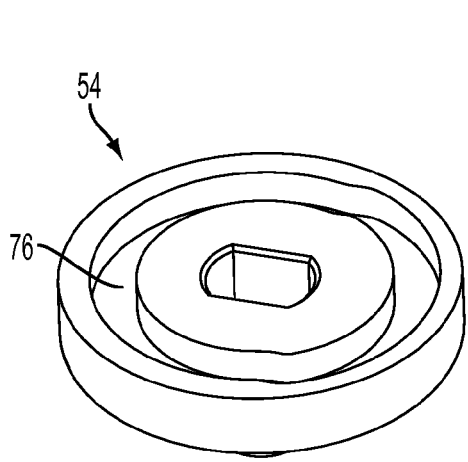
FIG. 8B shows another perspective view of the end component of FIG. 8A.
Figure 8C:
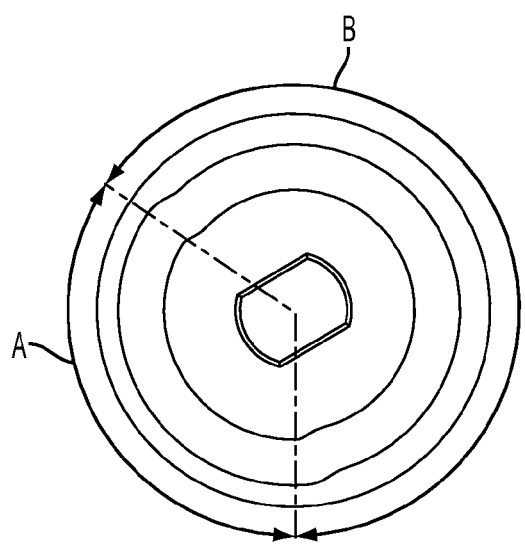
FIG. 8C shows a plan view of the end cap component of FIG. 8A.

The knob 67 of the pivot cam 66 is located within a continuous groove 76 of a radial face cam formed in the end cap 54. Referring to FIG. 8C, for example, the continuous groove 76 includes two arcuate sections formed in the surface of the end cap 54 at a location close to an outer circumference of the end cap 54. A first arcuate section A is located along a circumferential portion which is farther from the center of the end cap 54 than the second arcuate section B. In other words, the radii of the inner-most and outer-most edges of the groove are larger in arcuate section A as compared to the corresponding radii of arcuate section B. A set of transitional surfaces 72 is located between the first and second arcuate sections A and B. In other words, pivot cam 66 functions as a cam follower to the radial face cam formed in the end cap 54 by means of the knob 67.

Referring to FIG. 4D which is a side view of the hinge assembly 40 with the end cap 54 removed, the pivot cam 66 and the adapter 41 are illustrated in an initial position. In FIG. 4E, which is a cross-sectional view of the hinge assembly illustrated in FIG. 4B along section 4E-4E, the knob 67 of the pivot cam 66 is located within arcuate section B of the continuous groove 76 when the pivot cam 66 is in the initial position. In the initial position, the short end 65 of the torque element 62c is urged away from the long end 63, as illustrated in FIG. 4F. This is because the combined maximum width of the cradle 71 and the width (diameter) of the roller pin 68 is greater than the width (diameter) of the cradle 71 alone. The combination of the cradle 71 and roller pin 68 thus provides a shape similar to an ellipse. Urging the short end 65 of the torque element 62c away from the long end 63 reduces the clutching force of the torque element 62c on the surface of the shaft 56. As a result, less torque is needed to rotate shaft 56 with respect to the torque elements 62a, 62b, and 62c.

Figure 5A:
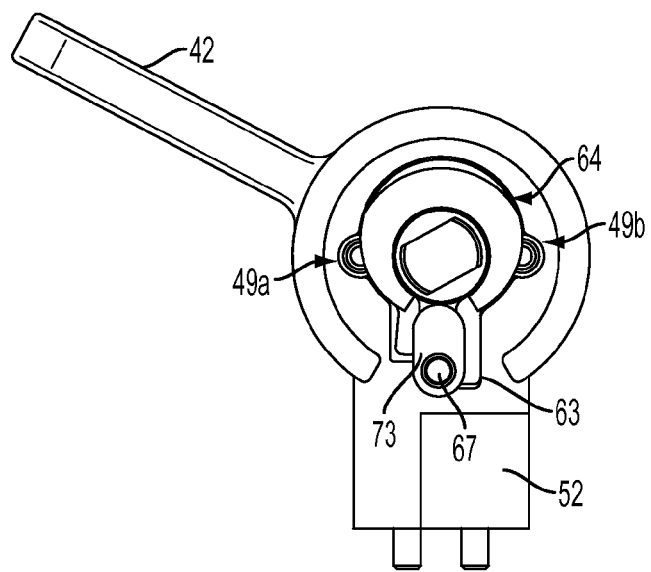
FIG. 5A shows the hinge assembly of FIG. 4A in a rotated position and with an end cap component removed in order to reveal internal components of the hinge assembly.
Figure 5B:
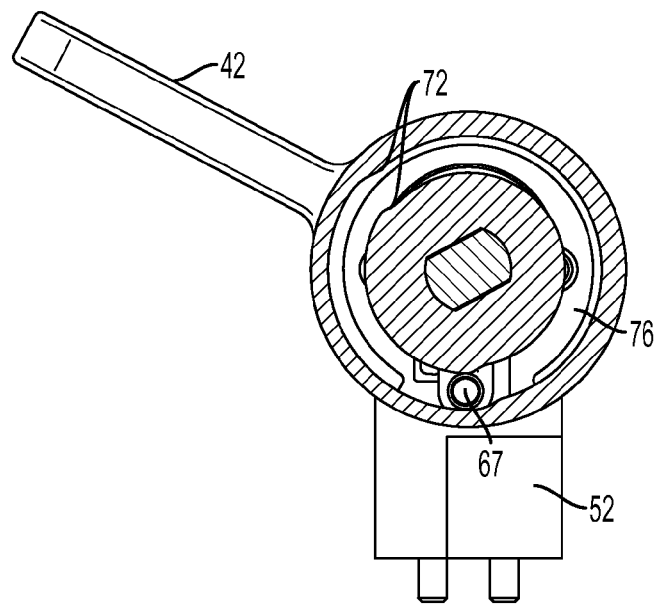
FIG. 5B shows a cross-sectional view of the hinge assembly at a section corresponding to section 4E-4E shown in FIG. 4B.

Referring now to FIGS. 5A and 5B, the adapter 41 is in a position similar to the panel 24a in FIG. 2 after the panel 24a has been rotated through spans θ1, θ2, and θ3 to position IV shown in FIG. 2. During rotation the knob 67 of the pivot cam 66 is guided along the transitional surfaces 72 into arcuate section A of the continuous groove 76 formed in end cap 54. This causes the pivot cam 66 to rotate about the axis of the axle 69 of the pivot cam 66 until the pivot cam 66 is in a substantially vertical position as shown in FIG. 5A.

Figure 5C:
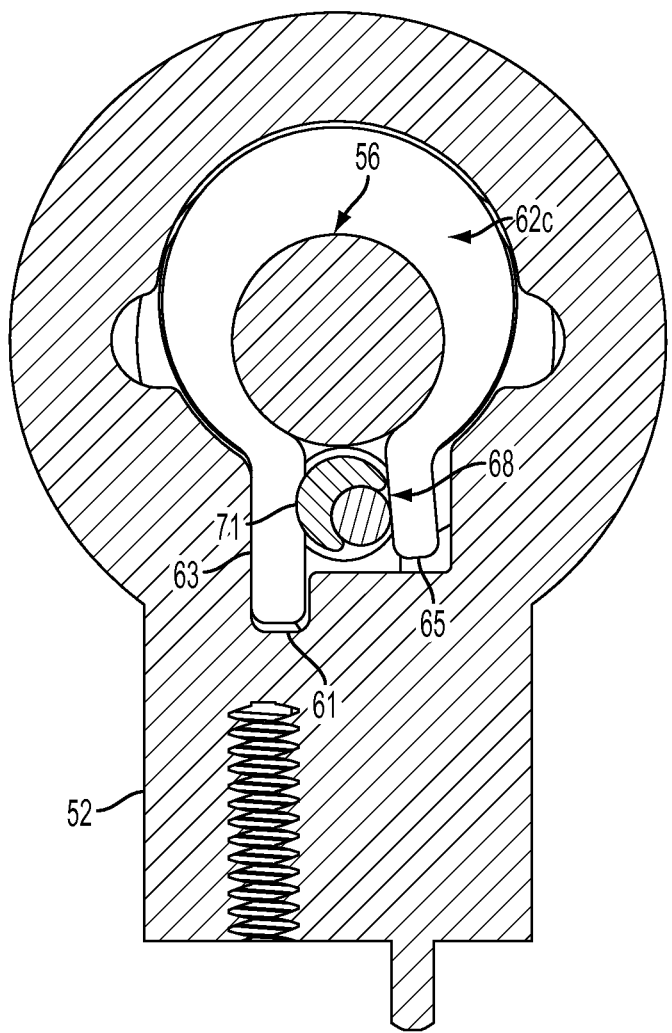
FIG. 5C shows a cross-sectional view of the hinge assembly at a section corresponding to section 4F-4F shown in FIG. 4B.

Referring to FIG. 5C, which is an illustration similar to FIG. 4F taken along section 4F-4F, the distance between the short end 65 and long end 63 of the torque element 62c has been reduced causing the torque element to relax and return to its position of maximum engagement with the shaft 56. Relaxation of the torque element 62c increases the frictional force applied to the shaft 56, thereby increasing the torque needed to rotate the shaft 56 and the resultant torque required to rotate components (such as panels 24a and 24b) with respect to one another. As understood by those of skill in the art, the location of the transitional surfaces 72, as well as the dimensions of the continuous groove 76 and the cradle 71 and roller pin 68, may be modified to select the location and degree of desired torque resistance during rotation of the adapter 41.

As described above, FIGS. 4A through 9D illustrate an embodiment of the invention in which a cam is used to adjust friction torque. In that embodiment, rotation of one or more cams with respect to one or more torque elements changes the distance between end portions of the torque element(s), thereby changing the compression of the torque element(s) on the shaft and the resulting friction torque. Accordingly, increasing the distance between end portions of the torque element(s) reduces friction torque, and decreasing the distance between end portions of the torque element(s) increases friction torque.

In an embodiment in which an exterior surface of one or more torque elements contacts an interior surface of a shaft or other component, changing the distance between end portions of the torque element(s) will have an opposite effect. Specifically, increasing the distance between end portions of the torque element(s) increases friction torque, and decreasing the distance between end portions of the torque element(s) decreases friction torque.

A second embodiment of a hinge assembly (hinge assembly 100) according to the present invention is illustrated in FIGS. 10A to 18. In this embodiment, for example, a variable friction hinging mechanism is provided in which friction torque can be adjusted down or up by input from an adjustment mechanism. It can be intended to be set by an operator of the hinge assembly according to the load from an object to be controlled or it can be set automatically. The torque generating portion of the hinge can include multiple identical torque elements stacked together on a pintle or cylindrical shaft and can be split into two equal groups separated by components of an adjustment mechanism.

The torque elements can be of symmetrical shape with a base of each torque element being trapped within a hinge housing by a locking pin, for example. According to one embodiment, two ends of the torque element clamping onto the shaft are controlled by two wedges on both sides of the hinge driven by a single screw with thread directions being left and right on opposite sides of the screw. This configuration (two groups of torque elements and a screw having left and right threads) can keep adjustment forces internal to the hinging mechanism and balanced. Progression of the wedges into the groups of torque elements incrementally (one torque element at a time) decreases friction torque generated by the mechanism, and opposite motion of the wedges (reversing the screw rotation) will incrementally increase friction torque.

Figure 10A:
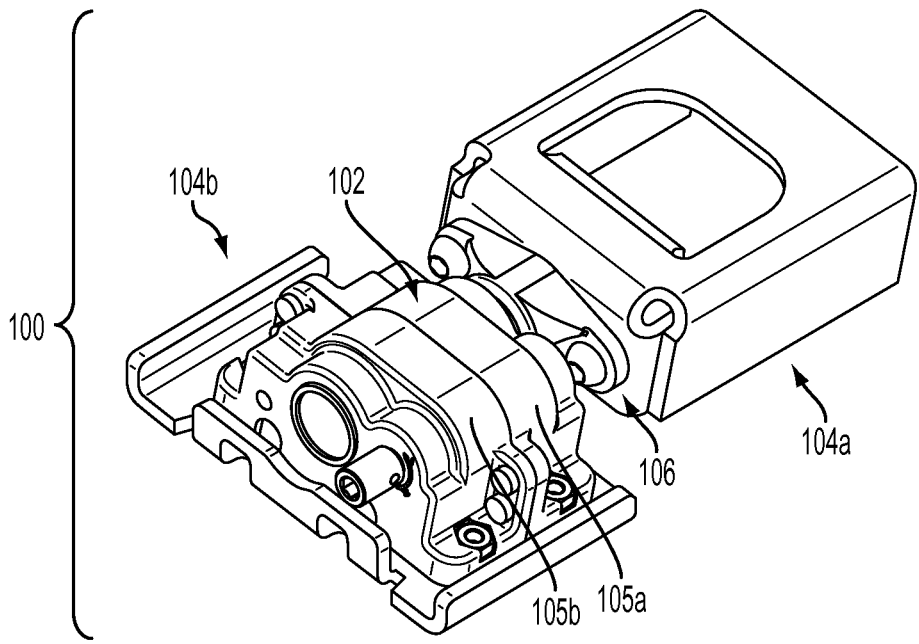
Figure 10B:
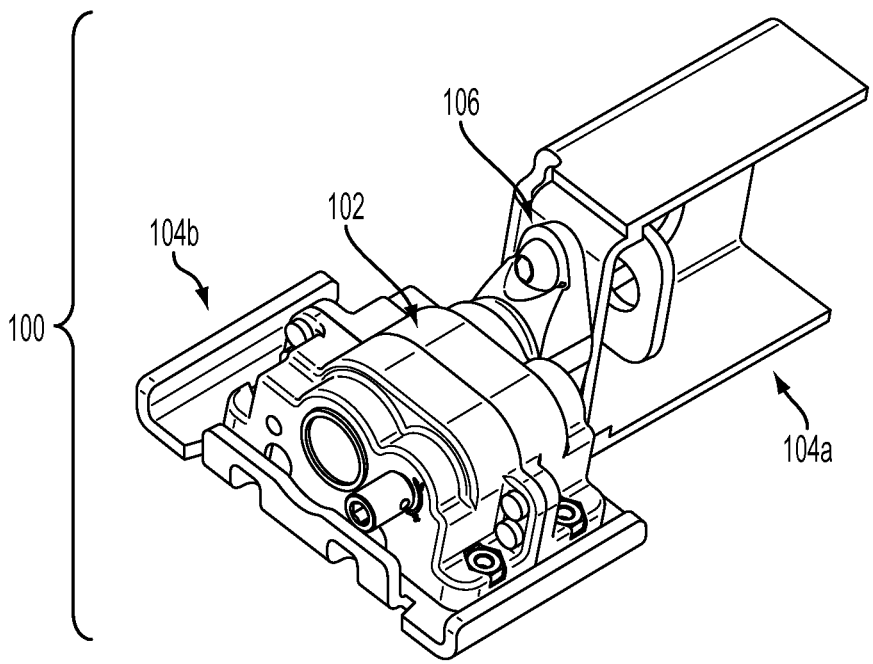
FIG. 10B shows the hinge assembly of FIG. 10A rotated into a second position.

Referring to FIGS. 10A and 10B, the hinge assembly 100 includes a housing 102 connected to components 104a and 104b. The component 104a is connected via an adapter 106 which rotates with the component 104a. The housing 102 is coupled to component 104b. Accordingly, components 104a and 104b are rotatable about a common axis such that components 104a and 104b are positioned to extend along planes at various angles with respect to one another through a range of motion. The housing 102 comprises two halves 105a and 105b to allow easy access to the internal elements of the hinge assembly and for manufacturing purposes.

Figure 10C:
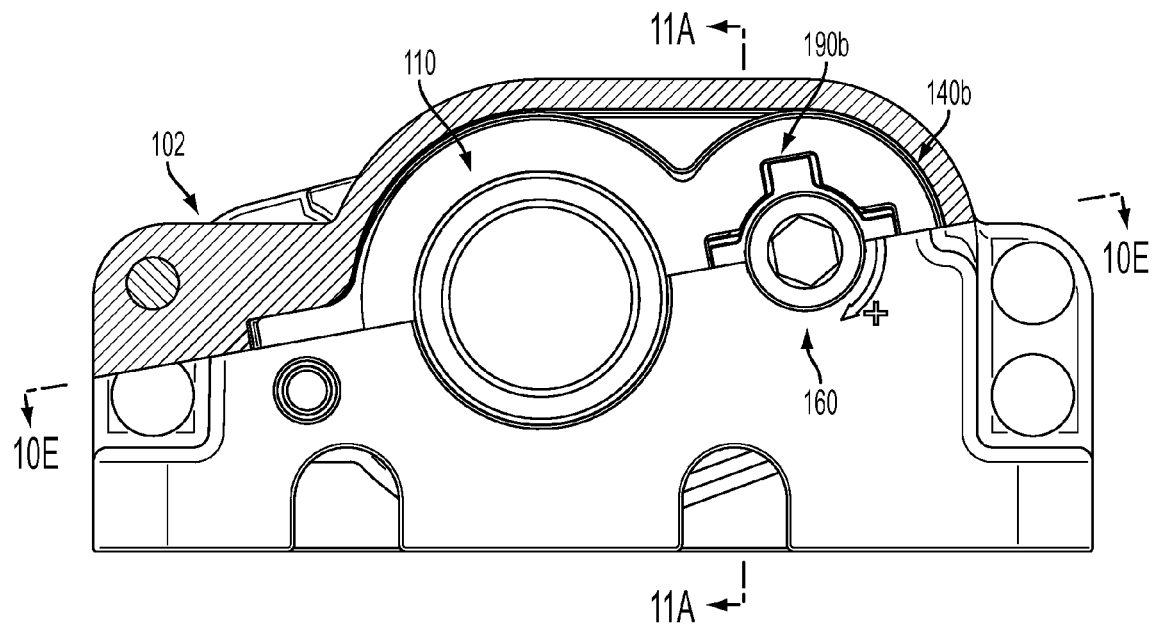
FIG. 10C shows a partial cross-sectional view of the hinge assembly of FIG. 10A to define sections 10E-10E and 11A-11A.
Figure 10D:
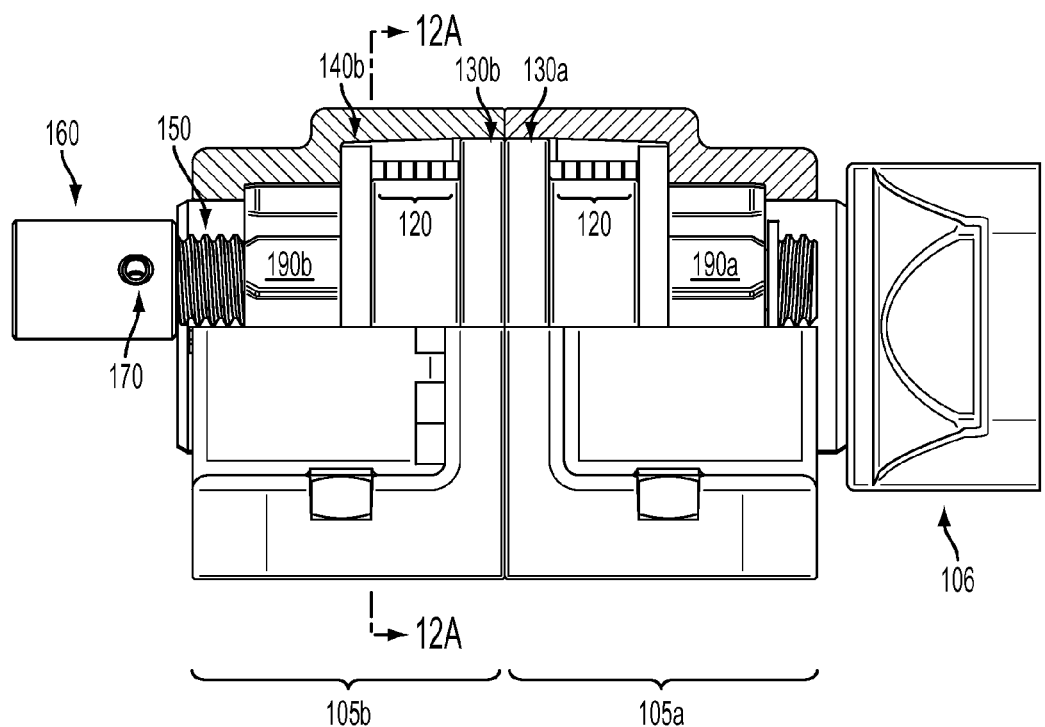
FIG. 10D shows a partial cross-sectional view of the hinge assembly of FIG. 10A to define section 12A-12A.
Figure 10E:
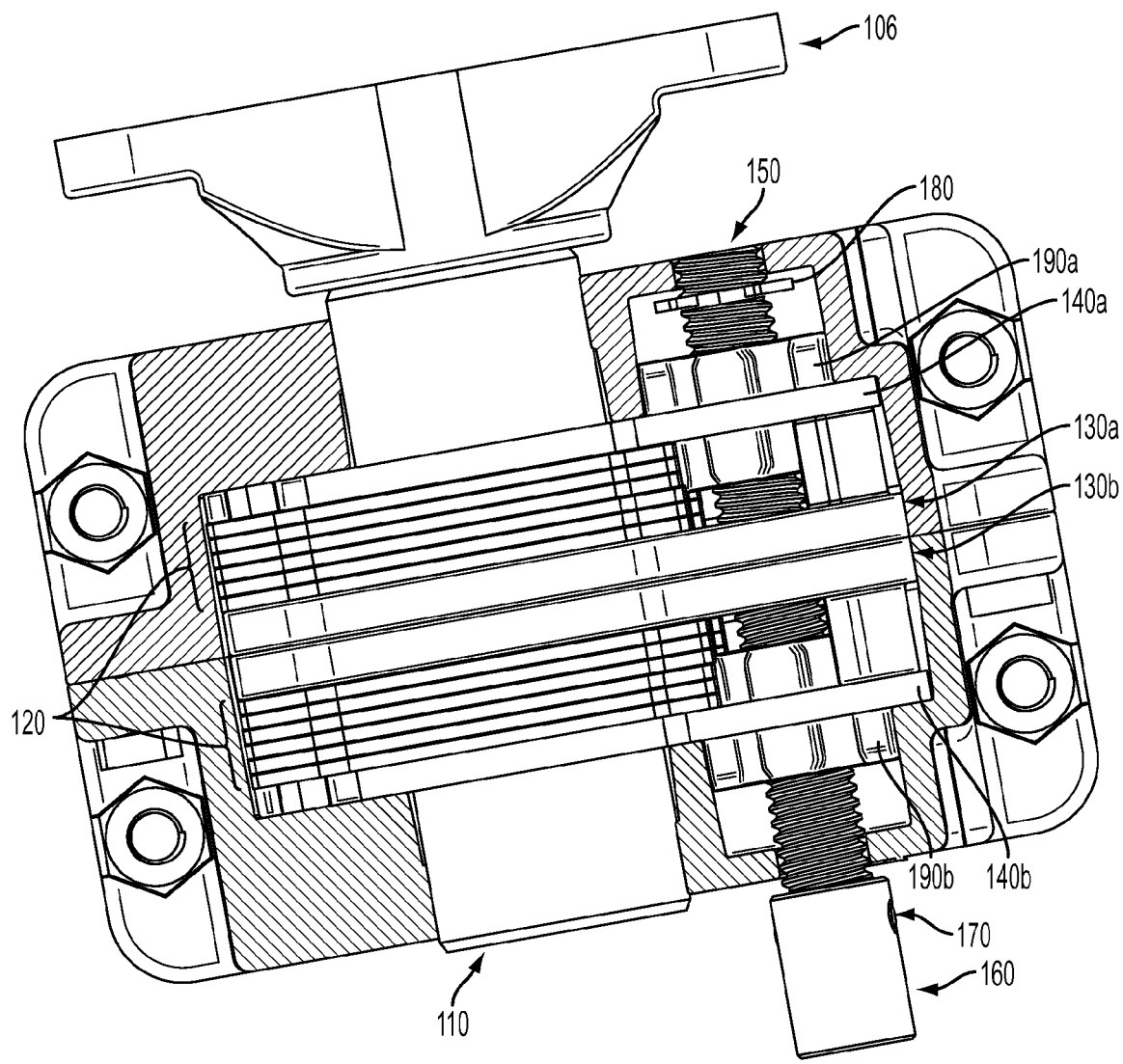
FIG. 10E shows a cross-sectional view of the hinge assembly of FIG. 10A along section 10E-10E.

Referring now to FIG. 10E, which is a cross-sectional view along section 10E-10E defined in FIG. 10C, a shaft 110 extends through the housing 102 with one end of the shaft 110 attached to the adapter 106. Each half of the housing 102 includes a plurality of crescent shaped torque elements 120 frictionally engaging the shaft 110, wherein each group of the torque elements 120 is located between a mid-plate 130a, 130b and an alignment plate 140a, 140b.

Also extending through the housing 102 is an adjustment screw 150 that is generally parallel to the shaft 110 (see also FIG. 18). One end of the adjustment screw 150 is inserted into an adjustment driver 160 and the relative position of the adjustment screw 150 and the adjustment driver 160 is held in place by radially inserting a driver pin 170 through the adjustment driver 160 and into the adjustment screw 150. The opposite end of the adjustment screw 150 includes a groove 151 for a retaining clip 180. The adjustment screw 150 also includes a divider 152. A left adjustment nut 190a is screwed onto the adjustment screw 150 on one side of the divider 152, and a right adjustment nut 190b is screwed onto the adjustment screw 150 on the opposite side of the divider 152.

Figure 15:
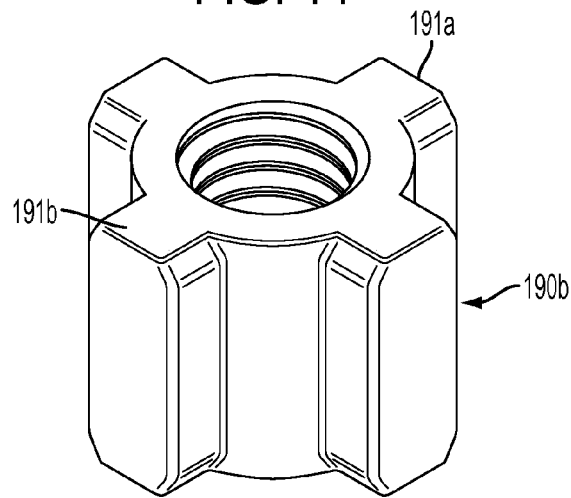
Figure 16:
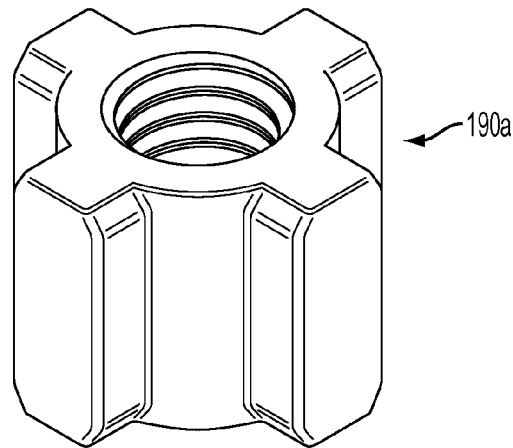

The adjustment screw 150 is threaded in the opposite direction on one side of the divider 152 as compared to the other. Also, as shown in FIGS. 15 and 16, the left adjustment nut 190a and the right adjustment nut 190b are threaded in opposite directions. Accordingly, rotation of the adjustment screw 150 with respect to the left adjustment nut 190a and the right adjustment nut 190b causes the left adjustment nut 190a and the right adjustment nut 190b to translate axially along the adjustment screw 150.

The hinge assembly 100 may be manually adjusted by a user to set the amount of torque resistance of the shaft 110 during rotation. As will be understood based on further explanation below, the adjustment can include partial or total increase or decrease in torque resistance by selectively activating or deactivating none or some or all of the torque elements 120.

Figure 11A:
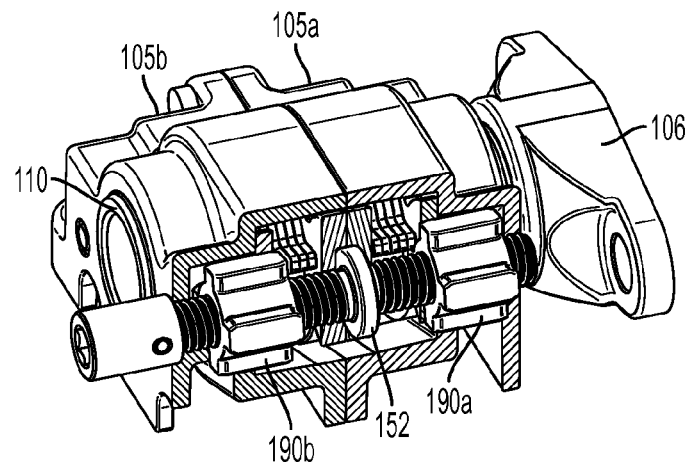
FIGS. 11A-11C show cross-sectional views of the hinge assembly of FIG. 10A along section 11A-11A in full torque, partial torque, and no or low torque positions, respectively.
Figure 11B:
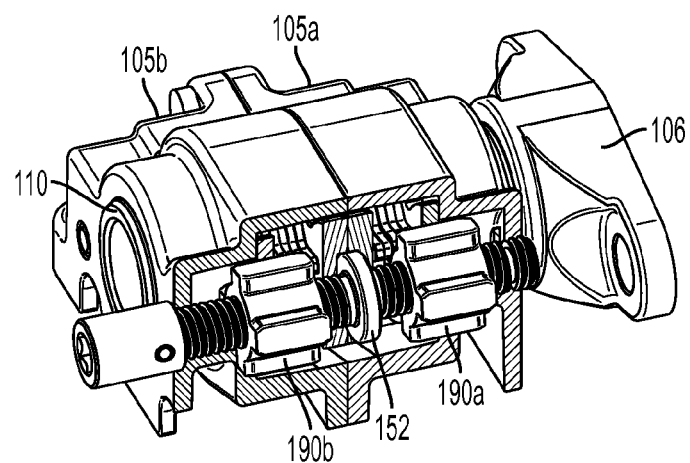
Figure 11C:
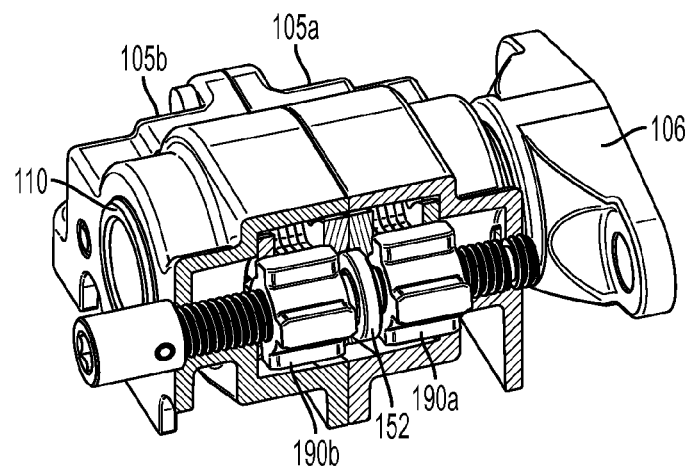

FIGS. 11A-11C show cross-sectional views of the hinge assembly of FIG. 10A along section 11A-11A in full torque, partial torque, and no or low torque positions, respectively. During operation, as illustrated in FIGS. 11A to 11C, which show cross-sectional views of the hinge assembly 100 along section 11A-11A in FIG. 10C in three progressive positions, the adjustment screw 150 is rotated from the adjustment driver 160 causing the adjustment nuts 190a, 190b to slide axially towards the divider 152, thereby relieving the frictional force applied to the surface of the shaft 110 by the torque elements 120. In other words, the adjustment nuts 190a, 190b act as wedges that enter the space between the end portions of the torque elements 120, thereby increasing the distance between the end portions, deforming the torque elements 120, and decreasing the compression of the torque elements 120 on the shaft 110.

Figure 12A:
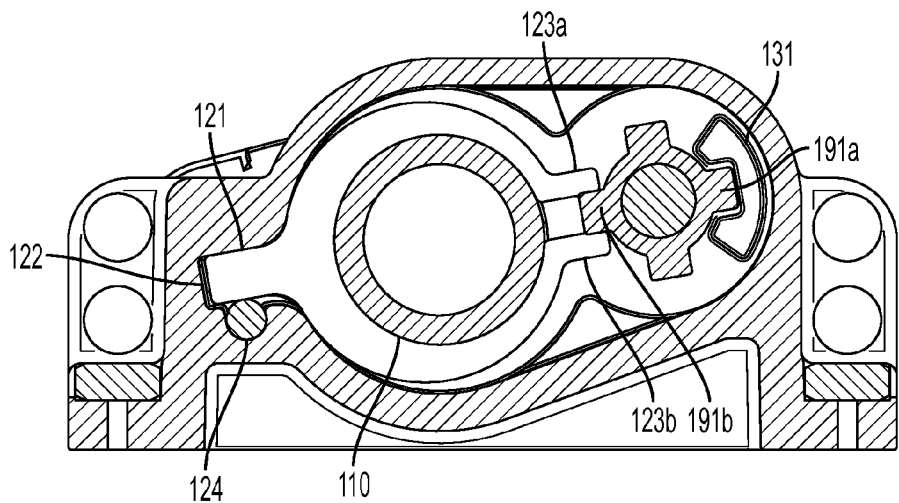
FIGS. 12A-12C show cross-sectional views of the hinge assembly of FIG. 10A along section 12A-12A in full torque, partial torque, and no or low torque positions, respectively.
Figure 12B:
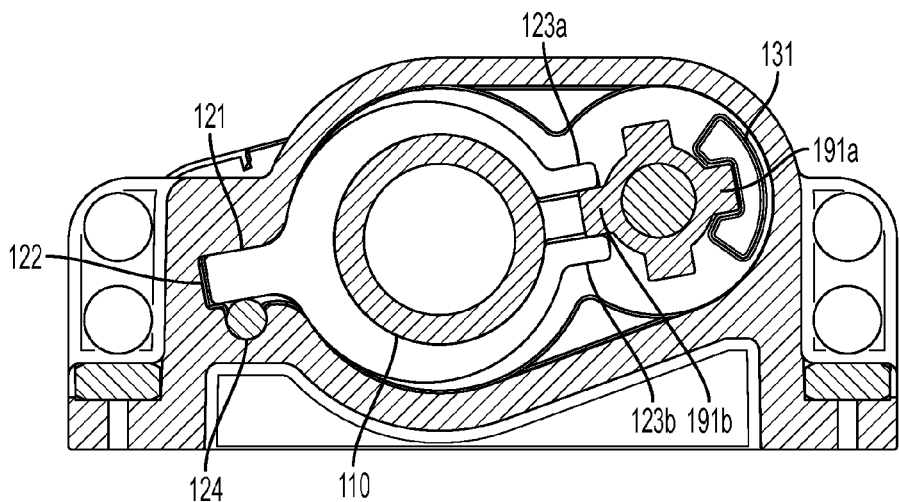
Figure 12C:
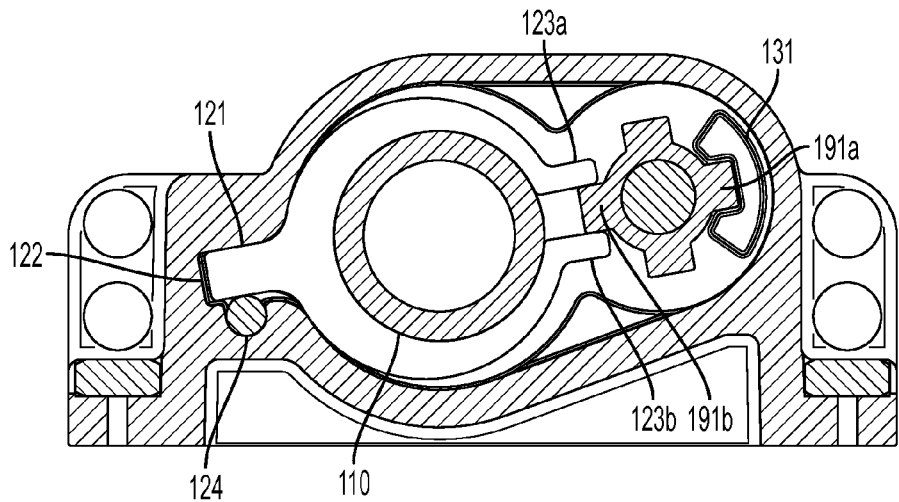
Figure 13:
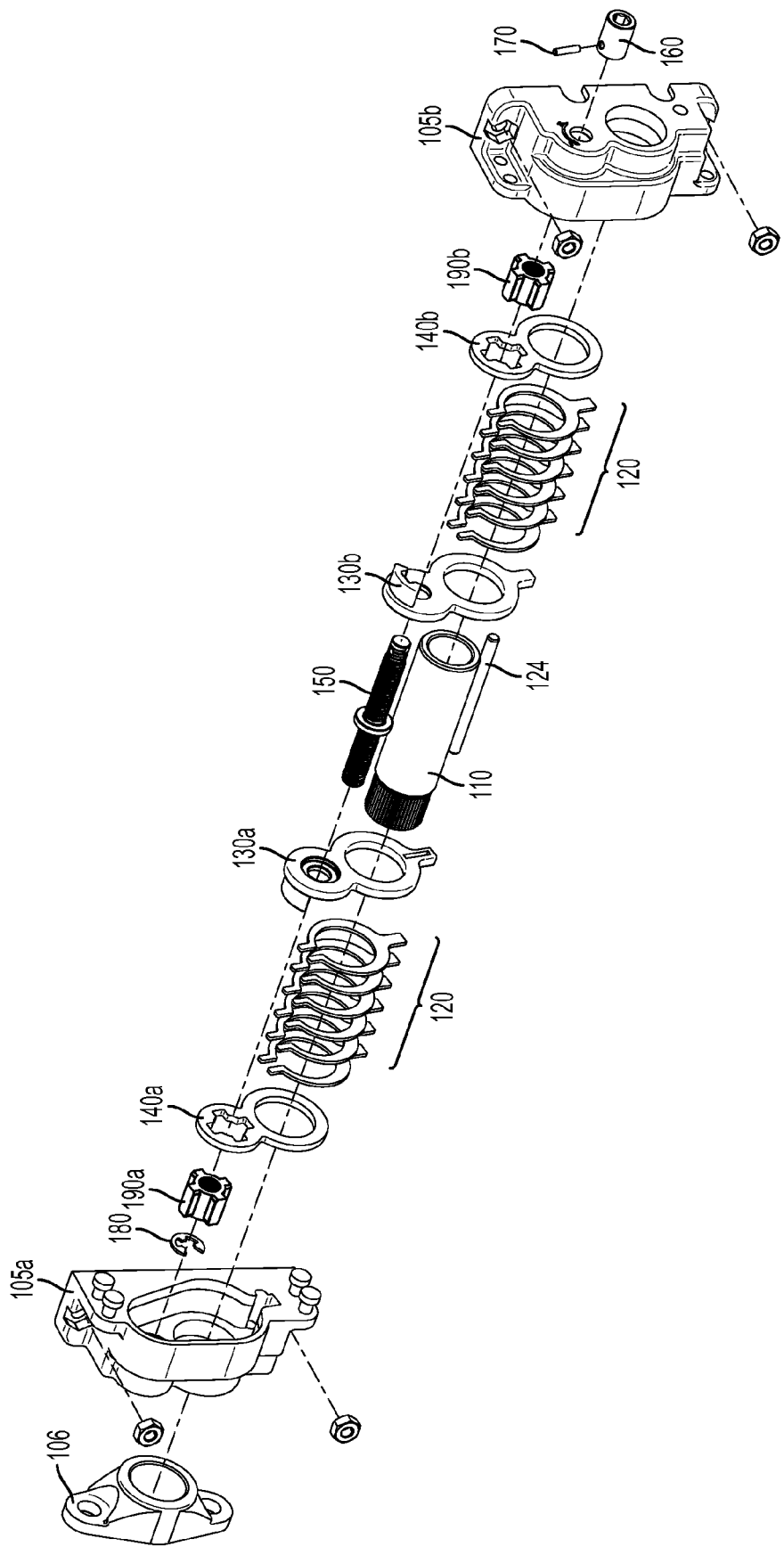
Figure 14:
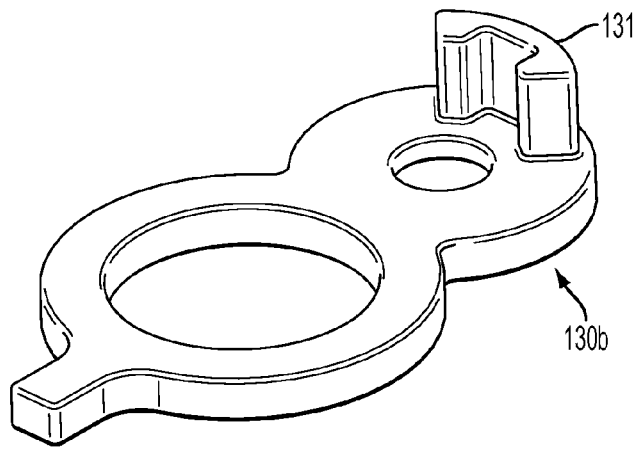

FIGS. 12A-12C show cross-sectional views of the hinge assembly of FIG. 10A along section 12A-12A in full torque, partial torque, and no or low torque positions, respectively. Referring specifically to FIGS. 12A through 12C, which are cross-sectional views taken along section 12A-12A defined in FIG. 10D, a torque element 120 includes a tail 121 which is inserted into a notch 122 in the housing 102 to prevent rotation of the torque element 120 with respect to the housing 102 during rotation of the shaft 110. To further prevent movement of the torque element 120, a coil pin 124 may be inserted into the housing to bear against the tail 121 of the torque element 120.

The adjustment nut 190b has four equally spaced extensions around its circumference. The external shape of the adjustment nut 190b matches the hole in alignment plate 140b, thereby preventing rotation of the adjustment nut with the adjustment screw 150. One extension 191a of the adjustment nut 190b is positioned within a rail 131 extending from the midplate 130b. The extension 191b located on the opposite side of the adjustment nut 190b from the first extension 191a acts as a wedge during axial movement along the adjustment screw 150.

As illustrated in FIG. 12B, axial movement of the adjustment nut 190b causes the ends 123a, 123b of one or more torque elements 120 to separate. In the position shown in FIG. 12B, the extension 191b of the adjustment nut 190b extends between ends 123a, 123b of some of the torque elements 120 (those that are closest in FIG. 12B) but does not extend between ends 123a, 123b of other of the torque elements 120. This relieves or reduces the frictional engagement between the shaft 110 and the torque elements 120, thereby reducing the amount of torque needed to rotate the shaft 110. In FIG. 12A, however, the extension 191b of the adjustment nut 190b does not extend between ends 123a, 123b of any of the torque elements 120, and in FIG. 12C the extension 191b of the adjustment nut 190b extends between ends 123a, 123b of all of the torque elements 120. Accordingly, FIGS. 11A and 12A show the hinge assembly in a full torque condition, FIGS. 11B and 12B show the hinge assembly in a half or partial torque condition, and FIGS. 11C and 12C show the hinge assembly in a minimum or no torque condition.

As understood by those of skill in the art, the number of torque elements and dimensions of the adjustment nuts may be modified to select the degree of desired torque resistance during rotation of the adapter.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A hinge assembly having variable friction torque, the hinge assembly comprising:
   an elongated element having an elongated element surface extending generally along a longitudinal axis;
   at least one torque element positioned along the elongated element surface for rotation with respect to the longitudinal axis, the at least one torque element having end portions, a torque element surface extending between the end portions, a first condition in which at least a portion of the torque element surface is in friction contact with the elongated element surface and the torque element is in compressive engagement with the elongated element for friction resistance to rotation, and a second condition in which the compressive engagement with the elongated element and the friction resistance to rotation is reduced or eliminated; and
   at least one actuator between the end portions of the torque element and coupled for movement with respect to the at least one torque element, the at least one actuator being configured to change the friction torque generated between the elongated element and the at least one torque element, the at least one actuator having an actuator surface positioned to contact at least one of the end portions of the at least one torque element and to change the distance between the end portions of the at least one torque element and thereby move the at least one torque element toward the first condition or the second condition, thus changing frictional resistance to rotation of the at least one torque element with respect to the elongated element,
   wherein the at least one actuator comprises a cam positioned for rotation with respect to the at least one torque element, the actuator surface being a cam surface contacting at least one of the end portions of the at least one torque element, wherein rotation of the cam with respect to the at least one torque element changes the distance between the end portions of the at least one torque element, thus changing frictional resistance to rotation of the at least one torque element with respect to the elongated element.

2. The hinge assembly of claim 1, wherein the elongated element comprises a shaft extending along the longitudinal axis and the torque element surface of the at least one torque element faces an outer elongated element surface of the shaft.

3. The hinge assembly of claim 1 comprising a plurality of torque elements, wherein the cam surface of the cam contacts at least one of the end portions of each of the torque elements, wherein rotation of the cam with respect to the torque elements changes the distance between the end portions of each of the torque elements, thus changing frictional resistance to rotation of each of the torque elements with respect to the elongated element and providing simultaneous relief of frictional resistance.

4. The hinge assembly of claim 1 comprising a plurality of torque elements, wherein the cam surface of the cam contacts at least one of the end portions of fewer than all of the torque elements, wherein rotation of the cam with respect to the torque elements changes the distance between the end portions of fewer than all of the torque elements, thus changing frictional resistance to rotation of fewer than all of the torque elements with respect to the elongated element and providing sequential relief of frictional resistance.

5. The hinge assembly of claim 1, wherein the cam is configured to rotate in response to the rotational position of the at least one torque element with respect to the elongated element to adjust the frictional resistance to rotation of the at least one torque element with respect to the elongated element based on the rotational position in a span of rotational movement.

6. The hinge assembly of claim 1, wherein the cam is configured to rotate in response to the rotational direction of movement of the at least one torque element with respect to the elongated element to adjust the frictional resistance to rotation of the at least one torque element with respect to the elongated element based on the rotational direction of movement.

7. The hinge assembly of claim 1, wherein the cam is positioned for rotation about an axis substantially parallel to the longitudinal axis of the elongated element.

8. The hinge assembly of claim 1, wherein the cam is positioned for rotation about an axis substantially perpendicular to the longitudinal axis of the elongated element.

9. The hinge assembly of claim 1, wherein the at least one torque element comprises a clip.

10. The hinge assembly of claim 1, wherein the at least one torque element comprises a band.

11. A hinged system assembly having variable friction torque, the hinged system comprising components positioned for rotational movement with respect to one another and the hinge assembly of claim 1 coupled to the components, wherein the at least one actuator is configured to change the friction torque generated between the components, thus changing frictional resistance to rotation of the components with respect to one another.

12. The hinge assembly of claim 1, wherein in the second condition, the portion of the torque element surface in friction contact with the elongated element surface is reduced or eliminated.

13. A method for facilitating variable friction resistance in a hinge, the method comprising:
compressively engaging a generally cylindrical surface of at least one torque element with a generally cylindrical surface of an elongated element;
positioning an actuator between end portions of the at least one torque element to selectively change the relative position of the end portions to change the friction resistance generated by the at least one torque element, thus reducing compressive engagement between the cylindrical surface of the at least one torque element and the cylindrical surface of the elongated element;
wherein the actuator comprises a cam positioned for rotation with respect to the at least one torque element, the actuator having a cam surface contacting at least one of the end portions of the at least one torque element, wherein the positioning step includes rotation of the cam with respect to the at least one torque element and changing the distance between the end portions of the at least one torque element, thus changing frictional resistance to rotation of the at least one torque element with respect to the elongated element.

14. A method for varying friction resistance between components positioned for rotational movement with respect to one another, the method comprising:
rotating the components with respect to one another away from a first position toward a second position causing at least one torque element to rotate with respect to the longitudinal axis of an elongated element in a first condition in which at least a portion of a torque element surface of the at least one torque element is in friction contact with an elongated element surface of the elongated element;
changing the friction torque generated between the elongated element and the at least one torque element at the second position by changing the distance between end portions of the at least one torque element with an actuator positioned between the end portions and moving the at least one torque element from the first condition toward a second condition in which a compressive force between the torque element surface and the elongated element surface is reduced or eliminated, thus changing frictional resistance to rotation of the at least one torque element with respect to the elongated element; and
rotating the components with respect to one another away from the second position toward a third position with reduced friction resistance between components;
wherein the actuator comprises a cam positioned for rotation with respect to the at least one torque element, the actuator having a cam surface contacting at least one of the end portions of the at least one torque element, wherein the changing step includes rotation of the cam with respect to the at least one torque element and changing the distance between the end portions of the at least one torque element, thus changing frictional resistance to rotation of the at least one torque element with respect to the elongated element.

15. A hinge assembly having variable friction torque, the hinge assembly comprising:
an elongated element having an elongated element surface extending generally along a longitudinal axis;
at least one torque element positioned along the elongated element surface for rotation about the longitudinal axis, the at least one torque element having end portions, a torque element surface extending between the end portions, a first condition in which at least a portion of the torque element surface is in friction contact with the elongated element surface, and a second condition in which a compressive force between the torque element surface and the elongated element surface is reduced or eliminated; and means positioned between the end portions of the at least one torque element for changing the friction torque generated between the elongated element and the at least one torque element by changing the distance between the end portions of the at least one torque element and moving the at least one torque element toward the first condition or the second condition, thus changing frictional resistance to rotation of the at least one torque element with respect to the elongated element, wherein the means for changing the friction torque comprises a cam positioned for rotation with respect to the at least one torque element, the cam having a cam surface contacting at least one of the end portions of the at least one torque element, wherein rotation of the cam with respect to the at least one torque element changes the distance between the end portions of the at least one torque element, thus changing frictional resistance to rotation of the at least one torque element with respect to the elongated element.

16. A hinge assembly having variable friction resistance, the hinge assembly comprising:

an elongated element having a generally cylindrical surface extending longitudinally;

a plurality of torque elements, each having a generally cylindrical surface compressively engaged with the cylindrical surface of the elongated element, the cylindrical surface of each of the plurality of torque elements having end portions; and at least one actuator configured for changing friction resistance generated by the plurality of torque elements by changing the relative position of the end portions of at least one of the plurality of torque elements, thus reducing compressive engagement between the cylindrical surface of the at least one of the plurality of torque elements and the cylindrical surface of the elongated element;

wherein the at least one actuator comprises a cam positioned for rotation with respect to the torque elements, the actuator including a cam surface contacting at least one of the end portions of at least one of the torque elements, wherein rotation of the cam with respect to the at least one torque element changes the distance between the end portions of the at least one torque element, thus changing frictional resistance to rotation of the at least one torque element with respect to the elongated element.

17. A hinge assembly having variable friction torque, the hinge assembly comprising:

an elongated element having an elongated element surface extending generally along a longitudinal axis;

a plurality of torque elements positioned along the elongated element surface for rotation with respect to the longitudinal axis, each of the plurality of torque elements having end portions, a torque element surface extending between the end portions, a first condition in which at least a portion of the torque element surface of at least one torque element is in friction contact with the elongated element surface and the at least one torque element is in compressive engagement with the elongated element for friction resistance to rotation, and a second condition in which the compressive engagement with the elongated element and the friction resistance to rotation is reduced or eliminated; and at least one actuator coupled for movement with respect to the plurality of torque elements, the at least one actuator being configured to change the friction torque generated between the elongated element and at least one torque element, the at least one actuator having an actuator surface positioned to contact at least one of the end portions of at least one torque element and to change the distance between the end portions of the at least one torque element and thereby move the at least one torque element toward the first condition or the second condition, thus changing frictional resistance to rotation of the at least one torque element with respect to the elongated element, wherein the at least one actuator comprises a cam positioned for rotation with respect to the at least one torque element, the at least one actuator including a cam surface contacting at least one of the end portions of the at least one torque element, wherein rotation of the cam with respect to the at least one torque element changes the distance between the end portions of the at least one torque element, thus changing frictional resistance to rotation of the at least one torque element with respect to the elongated element.

18. A method for facilitating variable friction resistance in a hinge, the method comprising:

compressively engaging a generally cylindrical surface of a plurality of torque elements with a generally cylindrical surface of an elongated element;

positioning an actuator to selectively change the relative position of end portions of at least one of the plurality of torque elements to change the friction resistance generated by the plurality of torque elements, thus reducing compressive engagement between the cylindrical surface of the at least one of the plurality of torque elements and the cylindrical surface of the elongated element;

wherein the actuator comprises a cam positioned for rotation with respect to the at least one torque element, the actuator having a cam surface contacting at least one of the end portions of the at least one torque element, wherein the positioning step includes rotation of the cam with respect to the at least one torque element and changing the distance between the end portions of the at least one torque element, thus changing frictional resistance to rotation of the at least one torque element with respect to the elongated element.

19. A method for varying friction resistance between components positioned for rotational movement with respect to one another, the method comprising:

rotating the components with respect to one another away from a first position toward a second position causing a plurality of torque elements to rotate with respect to the longitudinal axis of an elongated element in a first condition in which at least a portion of a torque element surface of at least one of the plurality of torque elements is in friction contact with an elongated element surface of the elongated element;

changing the friction torque generated between the elongated element and the plurality of torque elements at the second position by changing the distance between end portions of the at least one of the plurality of torque elements and moving the plurality of torque elements from the first condition toward a second condition in which a compressive force between the torque element surface and the elongated element surface is reduced or eliminated, thus changing frictional resistance to rotation of the plurality of torque elements with respect to the elongated element; and rotating the components with respect to one another away from the second position toward a third position with reduced friction resistance between components;

wherein a cam is positioned for rotation with respect to the at least one torque element, the cam contacting at least one of the end portions of the at least one torque element, wherein the changing step includes rotation of the cam with respect to the at least one torque element and changing the distance between the end portions of the at least one torque element, thus changing frictional resistance to rotation of the at least one torque element with respect to the elongated element.

20. A hinge assembly having variable friction torque, the hinge assembly comprising:

an elongated element having an elongated element surface extending generally along a longitudinal axis;

a plurality of torque elements positioned along the elongated element surface for rotation about the longitudinal axis, each of the plurality of torque elements having end portions, a torque element surface extending between the end portions, a first condition in which at least a portion of the torque element surface is in friction contact with the elongated element surface, and a second condition in which a compressive force between the torque element surface and the elongated element surface is reduced or eliminated; and means for changing the friction torque generated between the elongated element and the plurality of torque elements by changing the distance between the end portions of at least one of the plurality of torque elements and moving the plurality of torque elements toward the first condition or the second condition, thus changing frictional resistance to rotation of the at least one of the plurality of torque elements with respect to the elongated element;

wherein the changing means comprises a cam positioned for rotation with respect to the torque elements, the actuator surface being a cam surface contacting at least one of the end portions of at least one of the torque elements, wherein rotation of the cam with respect to the at least one torque element changes the distance between the end portions of the at least one torque element, thus changing frictional resistance to rotation of the at least one torque element with respect to the elongated element.

* * * * *